United States Patent
Launay et al.

(10) Patent No.: US 12,090,717 B2
(45) Date of Patent: Sep. 17, 2024

(54) METHOD AND COMPOSITION FOR TINTING A SPECTACLE LENS SUBSTRATE

(71) Applicant: Carl Zeiss Vision International GmbH, Aalen (DE)

(72) Inventors: Florian Launay, Aalen (DE); Dominik Wiedemann, Aalen (DE); Christian Wolff, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/592,714

(22) Filed: Mar. 1, 2024

(65) Prior Publication Data
US 2024/0198613 A1     Jun. 20, 2024

Related U.S. Application Data

(63) Continuation of application No. PCT/EP2022/074717, filed on Sep. 6, 2022.

(30) Foreign Application Priority Data

Sep. 10, 2021 (EP) .................................... 21195942

(51) Int. Cl.
    B29D 11/00     (2006.01)
    B29C 35/02     (2006.01)
    (Continued)

(52) U.S. Cl.
    CPC ........ B29D 11/00903 (2013.01); B29C 35/02 (2013.01); B29D 11/00923 (2013.01);
    (Continued)

(58) Field of Classification Search
    CPC ........ B29D 11/00903; B29D 11/00923; B29C 35/02; G02C 7/108; B29K 2023/06; B29K 2023/12; B29K 2091/00; B29K 2105/0032
    (Continued)

(56) References Cited

U.S. PATENT DOCUMENTS 8,740,996 B2    6/2014    Burguiere et al.
9,709,819 B2    7/2017    Lippens et al.
(Continued)

FOREIGN PATENT DOCUMENTS

EP     1 340 108 B9     8/2006
EP     3 266 598 A1     1/2018
(Continued)

OTHER PUBLICATIONS

U.S. Appl. No. 18/592,775, filed Mar. 1, 2024, Christian Wolff, Florian Launay, Michael Krieger.
(Continued)

*Primary Examiner* — James R Greece
(74) *Attorney, Agent, or Firm* — Tautz & Schuhmacher LLC; Georg Hasselmann

(57) ABSTRACT

A method for tinting a spectacle lens substrate includes providing a spectacle lens substrate made from a polymeric lens material, providing a composition having a polymeric carrier material, applying a pattern of the composition on a surface of the spectacle lens substrate, and heating the spectacle lens substrate to allow for diffusion of a dye substance between the carrier material and the lens material. Moreover, a composition for in-substrate tinting of a polymeric spectacle lens substrate and a spectacle lens substrate having a polymeric lens material which exhibits a pattern of a composition having a polymeric carrier material applied on a surface of the spectacle lens substrate are presented.

31 Claims, 11 Drawing Sheets

(51) Int. Cl.
  *G02C 7/10*      (2006.01)
  *B29K 23/00*     (2006.01)
  *B29K 91/00*     (2006.01)
  *B29K 105/00*    (2006.01)
(52) U.S. Cl.
  CPC .......... *G02C 7/108* (2013.01); *B29K 2023/06* (2013.01); *B29K 2023/12* (2013.01); *B29K 2091/00* (2013.01); *B29K 2105/0032* (2013.01)
(58) Field of Classification Search
  USPC .................................................... 351/159.66
  See application file for complete search history.

(56) References Cited

U.S. PATENT DOCUMENTS

| | | | |
|---|---|---|---|
| 2003/0170442 A1 | 9/2003 | Kaminsky et al. | |
| 2014/0099439 A1* | 4/2014 | Okubo | B29D 11/00865 427/164 |
| 2016/0168404 A1* | 6/2016 | Wu | C09D 11/322 106/31.13 |
| 2016/0282637 A1 | 9/2016 | Ryan | |
| 2018/0050549 A1 | 2/2018 | Frease et al. | |
| 2019/0358919 A1* | 11/2019 | Kumar | B29D 11/00653 |

FOREIGN PATENT DOCUMENTS

| | | |
|---|---|---|
| EP | 3 339 008 A1 | 6/2018 |
| JP | 2000-314 088 A | 11/2000 |
| JP | 2013218179 A | 10/2013 |
| WO | 2006/079564 A1 | 8/2006 |
| WO | 2018/113999 A1 | 6/2018 |
| WO | 2020/226632 A1 | 11/2020 |

OTHER PUBLICATIONS

Industrial Norm "Mineralölparaffine [Mineral oil paraffin] (ISO 2207:1983)," Dec. 1983, and English-language machine translation thereof.
Industrial Norm "Ophthalmic optics—Uncut finished spectacle lenses—Part 3: Transmittance specifications and test methods (ISO 8980-3)," English version EN ISO 8980-3:2003, Oct. 2003.
Meille et al., "Definitions of terms relating to crystalline polymers (IUPAC Recommendations 2011)," Pure Appl. Chem., vol. 83, No. 10, pp. 1831 to 1871, Aug. 3, 2011.
Industrial Norm "Ophthalmic optics—Spectacle lenses—Vocabulary (ISO 13666:2019)," English version EN ISO ISO 13666:2019, Dec. 2019.
Industrial Norm "Kunststoffe—Dynamische Differenzkalorimetrie (DSC) [Plastics—Dynamic Differential Scanning Calorimetry], (ISO 11357-2)," Aug. 2020, and English-language machine translation thereof.
European Search Report issued in EP 21 195 942.4, to which this application claims priority, mailed Apr. 22, 2022.
International Search Report issued in PCT/EP2022/074717, to which this application claims priority, mailed Feb. 17, 2023.
Written opinion issued in PCT/EP2022/074717, to which this application claims priority, mailed Feb. 17, 2023.
International Preliminary Report on Patentability issued in PCT/EP2022/074717, to which this application claims priority, mailed Nov. 29, 2023.
Office Action by the Chinese Patent Office (SIPO) issued in CN 202280057760.9, which is a counterpart hereof, mailed on May 17, 2024, and English translation thereof.

* cited by examiner

METHOD AND COMPOSITION FOR TINTING A SPECTACLE LENS SUBSTRATE

CROSS REFERENCE TO RELATED APPLICATIONS

This application is a continuation application of international patent application PCT/EP2022/074717, filed Sep. 6, 2022, designating the United States and claiming priority from European patent application 21 195 942.4, filed Sep. 10, 2021, and the entire content of both applications is incorporated herein by reference.

TECHNICAL FIELD

The present disclosure relates to a method for tinting of a spectacle lens substrate, a composition for tinting of a polymeric spectacle lens substrate, and a spectacle lens substrate comprising a polymeric lens material.

BACKGROUND

Ophthalmic lenses are tinted and/or marked for several reasons. For example, temporary markings on lens surfaces can be used to enable the alignment and the control of the alignment of finished ophthalmic lenses for subsequent treatment steps such as cutting or piercing. Due to the hydrophobic and/or oleophobic nature of the surfaces, caused either by the surface material itself or coatings applied on the surface, a simple surface printing does oftentimes not yield a marking with the required quality, especially desired resolution and durability.

U.S. Pat. No. 9,709,819 B2 discloses a method for printing a temporary inkjet marking or pattern on a surface, in particular a hydrophobic surface, having a good mechanical hold on the surface of the substrate and avoiding issues with coalescence of ink drops. The method comprises at least two ink printing passes. The first pass deposits a first layer of ink and comprises the ejection of drops of ink at a sufficient velocity to flatten them on the surface to be printed thus increasing the adhesion of the ink. The second pass comprises the ejection of ink drops which are generally of larger size than the ink drops of the first layer at an ejection velocity that is generally lower than the ejection velocity during the first pass. Due to the fact that ink drops are deposited on a sublayer of known cured ink, formed by the solidified ink drops of the first layer, the adhesion and the behavior of the ink drops of the second layer formed by the second pass become independent of the surface treatments and of the materials of the surface of the substrate, e.g., the ophthalmic lens.

However, the disclosed method is time consuming due to the two step procedure and can only be used for temporary markings as the deposited ink drops are located on the surface only.

Apart from temporary markings, tinting, sometimes referred to as coloring, of ophthalmic lenses is used for several purposes such as filtering light at a certain wavelength or aesthetic aspects. Conventionally, tinted ophthalmic lenses are prepared by immersing the substrate in a bath comprising a dye in a manual linear process. However, this method exhibits disadvantages with regard to reproducibility and homogeneity. Moreover, it is not possible to obtain a locally resolved tinting. So-called bleaching processes for removing excess dye from too-dark lenses also usually affect the whole lens as the whole lens is immersed in a bleaching bath.

To improve the tinting of ophthalmic lenses, U.S. Pat. No. 8,740,996 B2 discloses a transparent printing primer colorable by inkjet printing. It can be used in a method for coloring an optical lens or for producing a graphic representation on the lens that comprises the deposition of the primer on a surface of the optical lens, drying the primer, printing the primer using an inkjet printer, and drying the ink. Another method employing the application of an auxiliary layer on the lens surface is disclosed in JP 2000-314 088 A.

WO 2006/079564 A1 that is regarded as the closest related art with regard to the disclosure disclosed herein describes a method for tinting optical lenses, including: coating the substrate of an optical lens with a layer of an ink receptor material capable to form a porous ink receptor film, evaporating solvents present in the ink receptor material to form the porous film, applying an ink solution using an inkjet machine on the porous film in such conditions that the ink solution is absorbed within the film, heating the optical lens until the substrate has attained the desired tint and removing the ink receptor film.

However, one disadvantage of these methods is the need for an auxiliary layer and additional process steps related thereto.

EP 3 266 598 A1 discloses a process for permanent marking of optical eyeglasses. During a first step, an area of the optical eyeglass is treated by a laser beam to remove a surface coating in a detreated zone. The movements of the laser beam can be programmed to produce the pattern or an element of the pattern to be drawn on the eyeglass. Thereafter, an ink is deposited in the detreated zone in order to form the inked pattern, for example by inkjet printing. By this process, a surface coating which prevents the ink from adhering is locally removed in order to reach a layer of the ophthalmic lens having properties allowing the ink to be retained.

Disadvantageously, this method requires a laser treatment. Moreover, although the ink is deposited into recesses of the lens surface it is still located on a surface and thus prone to damages due to insufficient adherences.

US 2018/0 050 549 A1 discloses a method for coloring an optical element in a non-uniform linear pattern. A gradual, visually discernible variation in hue and/or color density over the entire area of the optical element upon exposure to actinic radiation is achieved by the deposition of a photochromic composition via inkjet printing techniques. However, as the photochromic composition is only present on the lens surface, it is also prone to damages due to insufficient adherences. Further, it is not possible to obtain locally resolved tinting with such a method. WO 2018/113999 A1 also discloses a method for obtaining a gradient pattern throughout at least one surface of an optical substrate.

EP 1 340 108 B9 discloses a photochromic imbibition composition with a kinetic enhancing additive. Such compositions can be deposited on a surface of a substrate and the photochromic compound is thermally transferred into the substrate together with the kinetic enhancing additive. The composition might comprise a carrier such as a solvent and/or a polymeric resin, essentially serving as a film-forming binder for the other components of the composition. However, the complexity of the composition might impede the production as well as application of the composition. Moreover, the diffused kinetic enhancing additive may adversely affect lens properties.

WO 2020/226 632 A1 discloses a thermal inkjet dye sublimation ink and a printing method, wherein a dye sublimation ink is printed from a thermal inkjet printhead either directly onto a textile fabric to form an image or onto a transfer medium to form an image on the transfer medium, followed by transferring the image from the transfer medium onto a textile substrate.

US 2019/358919 A1 discloses a method of producing an optical article including applying an imbibition composition having a dye onto a surface of a substrate. The coated substrate is irradiated with heat from a heat source to form a heat gradient across the coated substrate to diffuse the dye into the surface to form an imbibed substrate having a dye concentration gradient corresponding to the heat gradient. However, the resolution of the imbibed areas obtainable by the suggested method may not be sufficient for certain purposes such as obtaining distinct structures with high resolution due to heat conduction. Moreover, according to US 2019/358919 A1, the imbibition composition can have different amounts of dyes throughout a light influencing zone of the optical article, i.e., a portion of the optical article having a capability to exhibit optical properties when light contacts or traverses through the optical article. However, a drawback associated therewith is the need for imbibition compositions with different amounts of dyes.

US 2016/168404 A1 discloses a phase change ink composition for printing on ophthalmic lenses including a straight chain hydrocarbon wax and a branched hydrocarbon wax, an amide, wherein the amide is present in an amount of greater than about 25 percent by weight, a rosin ester, and a colorant.

US 2014/099439 A1 discloses a method for production an optical lens. The method includes: forming a mark outside a lens region set in a lens substrate, the mark being adapted to perform position alignment; pattern-forming a masking layer above one principal surface of the lens substrate while controlling formation position of the masking layer with the mark as a reference, the masking layer having an aperture at a predetermined position in the lens region; performing a selective process with respect to a surface exposed from the bottom of the aperture of the masking layer by performing a process from above the masking layer; and removing the masking layer from above the lens substrate to form a processed pattern by the selective process on the side of the one principal surface of the lens substrate.

US 2016/282637 A1 discloses a method for producing polarized eyewear. The method includes providing a polarizing film or a blank of the eyewear having a polarizing film, whereby the polarizing film is made of a substrate film and a polarizing agent; dipping the polarizing film or the blank with the polarizing film into a solvent; and dissolving the polarizing agent from the polarizing film.

EP 3 339 008 A1 discloses a method for producing a polarizer having a stepped or continuous gradient of polarization. The method comprises providing at least one polarizer comprising a substrate and at least one polarizing agent, and contacting the at least one polarizer at least partially with at least one reducing agent, the at least one reducing agent being reactive with the at least one polarizing agent to provide at least one reduced polarizing agent.

SUMMARY

It is an objective of the present disclosure to provide a method for tinting a spectacle lens substrate comprising a polymeric lens material which allows for tinting in an easily applicable, reproducible, and permanent manner, for example to obtain patterns with high spatial resolution.

It is a further objective of the present disclosure to provide a composition which can be used to achieve a tinting of a spectacle lens substrate in an easily applicable, reproducible, and permanent manner, for example to obtain patterns with high spatial resolution.

It is a further objective of the present disclosure to provide a precursor of a spectacle lens substrate with an improved tinting.

The first objective is achieved by a method for in-substrate tinting of a polymeric spectacle lens substrate allowing for diffusion of a dye substance between the polymeric carrier material and the polymeric lens material, the further objectives are achieved by a composition for in-substrate tinting of a polymeric spectacle lens and a spectacle lens substrate comprising a polymeric lens material wherein a congealing point Tc(carrier) of the polymeric carrier material is above a glass transition temperature Tg(lens) of the polymeric lens material.

Throughout this specification the following definitions apply:

The terms "polymer" and "polymeric" refer to natural or synthetic substances composed of macromolecules composed of many repeating subunits. They comprise homopolymers and copolymers, such as graft polymers.

A spectacle lens is an ophthalmic lens worn in front of, but not in contact with, the eyeball (DIN ISO 13666:2019, section 3.5.2), where an ophthalmic lens is a lens intended to be used for purposes of measurement, correction and/or protection of the eye, or for changing its appearance (DIN ISO 13666:2019, section 3.5.1). Here, a spectacle lens includes, but not limited thereto, a corrective lens, protective lens, absorptive lens, clear lens, tinted lens, uniformly tinted lens, gradient-tinted lens, double gradient-tinted lens, photochromic lens, polarizing lens, balancing lens, matching lens, etc. as defined in Section 3.5.3 to 3.5.13 of DIN ISO 13666:2019. Further, according to Section 3.6 of DIN ISO 13666:2019, a spectacle lens can have various lens shapes including, but not limited thereto, curved-form lens, plano lens, spherical lens, cylindrical lens, spherocylindrical lens, toric lens, aspheric lens, atoric lens, etc.

The term "spectacle lens substrate" refers to a piece of optical material that is used during the manufacturing process of a spectacle lens, i.e., precursors of the finished spectacle lens. Suitable precursors of the finished spectacle lens are for example semi-finished lens blanks, wherein the term "semi-finished lens blank" refers to a piece of optical material with one optically finished surface for the making of a spectacle lens (DIN ISO 13666:2019, section 3.8.1), In any case, the spectacle lens substrate as used herein exhibits at least one surface without any coatings such as AR (anti-reflective)- or HC (hard coat)-coatings which is to be used in the method described herein.

The term "lens material" refers to a material used for the manufacturing of the spectacle lens substrate. The spectacle lens substrate may comprise the lens material or consist of the lens material.

The term "surface" refers to any layer of the three-dimensional spectacle lens substrate that is in direct contact with the environment. The surface can be regarded as its boundary. The surfaces of a spectacle lens substrate include its front surface, i.e., frontside, side surface, i.e., edge, and back surface, i.e., backside.

In the context of a spectacle lens the expression "front surface" is used for a surface of a spectacle lens which when mounted and worn in the frame faces away from the wearer's eye (DIN ISO 13666:2019, section 3.8.13). In the context of a semi-finished lens blank, the expression "front surface" is used for a surface which will eventually become the front surface of a spectacle lens that is manufactured from the semi-finished lens blank. The curvature of a section of the front surface of a semi-finished lens blank which is used as a starting object from which a spectacle lens is manufactured may already resemble the curvature of the spectacle lens to be manufactured.

In the context of a spectacle lens the expression "back surface" is used for a surface of a spectacle lens which when mounted and worn in the spectacle frame faces towards the wearer's eye (DIN ISO 13666:2019, section 3.8.14). In the context of a semi-finished lens blank, the expression "back surface" is used for a surface which will eventually become the back surface of a spectacle lens that is manufactured from the semi-finished lens blank. The back surface of a semi-finished lens blank may be machined during the manufacturing process of a spectacle lens.

The term "composition" refers to either a single material or a mixture such as a solution, dispersion etc. of two or more different materials. In the present disclosure a composition which at least comprises a carrier material is used. The composition may consist of the carrier material or it may comprise other materials apart from the carrier material such as one or more dye substances. For example, the composition may consist of a mixture of the carrier material and one or more dye substances.

The term "locally resolved" means that different properties can be achieved with regard to the lateral dimensions of the surface of the spectacle lens substrate, for example a locally resolved tinted spectacle lens substrate exhibits tinted and non-tinted areas, e.g., in the form of a pattern, mark, letters, etc. Locally resolved may be used synonymously with the expression "patterned."

The term "in-substrate" refers to a process modifying at least a part of the substrate underneath its surface in contrast to processes only modifying the substrate surface such as the deposition of functional layers on the substrate surface. The modification of the substrate underneath its surface may for example occur until a depth of about 10 μm, about 50 μm, about 100 μm or even about 500 μm below the surface depending on several influencing factors, for example temperature, time, characteristics of carrier material, characteristics of dye substances etc.

The term "tinting" refers to a process of providing a tint to the spectacle lens substrate. A tinted spectacle lens substrate is a spectacle lens substrate for which at least a part of the electromagnetic spectrum, for example the illuminant spectrum perceivable by humans (380-780 nm) and/or other spectral ranges like the NIR (780-3000 nm), UV-A (315-380 nm) and UV-B (280 nm-315 nm) range, is damped due to the addition of a further substance, i.e., not by the polymeric lens material itself. The amount of damping may be, for example, 6-99%. In case of damping within the illuminant spectrum perceivable by humans, this might lead to a luminous transmittance as defined in DIN EN ISO 8980-3: 2014-03 of, for example, 1-94% in tinted lens areas. The luminous transmittance may be further influenced by the subsequent application of coatings, such as AR- or HC- coating. Traditionally, a tint can be obtained by dipping or immersing a substrate in a tinting bath, i.e., a liquid dye solution. The tinted substrate may exhibit a homogenous tint, i.e., a tinted area exhibits the same degree of transmission throughout or the tinted substrate may exhibit a tint gradient, i.e., the degree of transmission changes gradually within the tinted area.

The term "carrier material" refers to a material suitable to be loaded with a dye substance, i.e., a dye substance can be adsorbed to and/or dissolved and/or dispersed or otherwise contained in the carrier material.

The term "congealing point" refers to the highest temperature at which a liquid or a melted solid solidifies. For petroleum waxes, e.g., the waxes mentioned in this specification, it can be determined according to DIN ISO 2207: 1983-12. The congealing point may be the same as the melting point.

The term "glass transition temperature" refers to the temperature below which completely or partially amorphous polymers are in a glassy or hard-elastic, brittle state and above which they are in a highly viscous or rubber-elastic, flexible state. According to the IUPAC (Meille Stefano, V.; Allegra, G.; Geil Phillip, H.; He, J.; Hess, M.; Jin, J.-I.; Kratochvíl, P.; Mormann, W.; Stepto, R. (2011). "Definitions of terms relating to crystalline polymers (IUPAC Recommendations 2011)." Pure Appl. Chem. 83 (10): 1831. doi: 10.1351/PAC-REC-10-11-13.) the glass transition temperature is the temperature at which the glass transition occurs, i.e., at which a polymer melt changes on cooling to a polymer glass or a polymer glass changes on heating to a polymer melt. The glass transition temperature can be determined by Differential Scanning Calorimetry (DIN EN ISO 11357-2:2020-08). The term "glass transition temperature" as used within this disclosure refers to the onset of the glass transition temperature which is the temperature at which the glass transition starts. It can be determined by extrapolation of the related Differential Scanning Calorimetry curve.

The term "pattern" refers to one or more macroscopic elements, for example a number, a letter of any type of graphic, a graphic representation such a dot, symbol etc. A pattern used in the exemplary embodiments is the lettering "MARK." A pattern is formed by surface areas covered by the composition and surrounding areas not covered by the composition, i.e., free from the composition.

A material is regarded as being hydrophobic if the static contact angle of a water droplet on the surface of the material is greater than or equal to 90°.

The term "heating" refers to a method for increasing a temperature by the input of energy.

The term "diffusion" refers to the physical process of spreading through or into a surrounding material by mixing with it. Diffusion can be regarded as the net movement of molecules from a region of higher concentration to a region of lower concentration. Diffusion is driven by a gradient in concentration. The rate of diffusion is dependent on the temperature.

The term "dye substance" refers to a colored substance that makes the spectacle lens substrate permanently appear in a certain tint or is used to permanently change the tint of the spectacle lens substrate. In contrast to a dye substance, a photochromic substance changes the color or tint, respectively, non-permanently, i.e., reversibly, when exposed to light of a particular wavelength. The dye-substance is used in a tinting process as disclosed herein.

The term "solution" refers to a homogenous mixture in liquid or solid state of two or more substances, i.e., all substances form a single phase. In such a mixture, at least one substance called solute is dissolved in another substance called solvent. The solubility of the solute in the solvent is temperature dependent.

The term "saturated" refers to a solution in which the highest possible amount of the solute is dissolved at a certain temperature. Accordingly, "dissolving until saturation" means to dissolve the highest possible amount of the solute in the solvent at a certain temperature.

The terms "direct" and "directly" in the context of deposition or application of a composition to a surface mean that the composition is deposited on or applied to the surface without any other materials, for instance in form of layers, in between the surface and the composition.

The term "inkjet printing" refers to a non-contact method of creating a pattern on a surface by discrete deposition of ink droplets. The term "ink" refers to any composition regardless of its color that can be deposited droplet by droplet. To enable or facilitate the formation and deposition of droplets it might be required to heat the ink to a certain temperature. Common procedures for inkjet printing include the continuous inkjet method and the drop-on-demand method, both well known to the person skilled in the art.

The term "polyethylene wax" refers to polyethylene with a waxy or fatty character due to a low molar mass between 3,000 and 20,000 g/mol. "Oxidized polyethylene waxes" can for example be obtained by oxidation of polyethylene wax with oxygen containing gases.

The term "polypropylene wax" refers to polypropylene with a waxy or fatty character due to a low molar mass between 3,000 and 20,000 g/mol. "Oxidized polypropylene waxes" can for example be obtained by oxidation of polypropylene wax with oxygen containing gases.

The term "masking agent" refers to a material suitable to adhere to and cover the surface of the spectacle lens substrate and thus preventing contact between a dye substance and the surface area of the spectacle lens substrate masked by the masking agent.

The articles "a," "an," and "the" as used in this specification and the appended claims include plural referents unless expressly and unequivocally limited to one referent.

In a first aspect, the disclosure provides a method for in-substrate tinting, for example locally resolved in-substrate tinting, of a spectacle lens substrate. The method comprises the following steps: providing a spectacle lens substrate comprising a polymeric lens material, providing a composition comprising a polymeric carrier material, applying a pattern of the composition on a surface of the spectacle lens substrate and heating the spectacle lens substrate to allow for diffusion of a dye substance between the carrier material and the lens material.

Thereafter, the composition can be removed from the surface of the spectacle lens substrate.

The method employs diffusion of molecules of a dye substance between the carrier material and the lens material to obtain a permanent in-substrate tinting. Since the composition is applied as a pattern on the substrate surface, a locally resolved tinting can be obtained.

Typically, the transfer of the dye substance from/into the lens material occurs by diffusion only. This enables a good control of the transfer process.

To allow for proper diffusion, the process temperature should be selected properly. As different materials with different properties may be combined within the scope of the disclosure it is not possible to indicate a certain temperature that can be used for all material combinations. Still, the skilled person will be able to determine a suitable temperature considering the following restrictions.

The temperature should be below the congealing point of the carrier material to avoid spreading of melted carrier material on the substrate surface. This avoids distortion of the applied pattern due to gravity and deterioration of resolution caused thereby, i.e., a high spatial resolution with high reproducibility can be obtained.

Moreover, the temperature should be above the glass transition temperature of the lens material. This enables sufficiently fast diffusion of the dye substance due to the soft state of the lens material while maintaining the physical dimensions of the substrate.

Apart from these constraints, the temperature can typically be high enough that the mobility of the dye molecules enables a processing within the range of few seconds to about 7 days. This allows for reasonable production times. More typically, the temperature can be chosen in a way that diffusion of the dye substance from/into the lens material is magnitudes larger than diffusion of the very same dye substance within the lens material. This avoids deterioration of resolution and thus a substrate with a locally resolved in-substrate tinting with high resolution can be obtained.

Heating the spectacle lens substrate means that the temperature relevant for the occurrence of the above-mentioned processes is reached for sufficient time at least within the relevant areas of the spectacle lens substrate. In one exemplary embodiment, the heating temperature is maintained constant during the heating step. The heating might be carried out before and/or after applying the pattern of the composition. The heat source may be any conventional heat sources such as hot air heat source, infrared heat source, convection heat source, or microwave heat source, etc. In one exemplary embodiment, the heat source may be a hot air, for example, an oven. The heating may comprise the whole spectacle lens substrate or only a part of it. The heating may be also carried out by applying a heated composition so that the applied heated composition leads to heating of the spectacle lens substrate.

Lens materials which can be used in the context of the disclosure are lens materials conventionally used in optics and in ophthalmology. Suitable lens materials are for example of the following types: polycarbonate, polyamide, polyimide, polysulfone, copolymers of poly(ethylene terephthalate) and polycarbonate, polyolefins, polymers and copolymers of diethylene glycol bis(allyl carbonate), (meth)acrylic polymers and copolymers and epoxy polymers and copolymers. The refractive index of the lens material can be for example 1.50, 1.60 or 1.67. Specific examples for suitable lens materials are poly(allyl diglycol carbonate) (CR-39) with a refractive index of 1.50 and poly(thiourethane) with a refractive index of 1.60 (MR-8) or 1.67 (MR-7).

Dye substances which can be used in the context of the disclosure are dye substances, for example disperse dye substances, conventionally used in lens tinting. They should exhibit adequate light fastness and temperature stability. Suitable dye substances are for example Dianix Yellow AM-42, Serilene Scarlet G-LS, Dianix Turquoise S-BG, Terasil Blue 3 RL-01, Teratop Blue GLF, Dorospers Red KKR, Teratop Pink 3G, Dianix Orange S-G and CRX powder dyes such as fluo yellow 5944, lemon yellow 8043, gold yellow 3441, orange 5945, orange 3439, scarlet 3443, red 8153, pink 3442, fuchsia 8168, purple 3735, mauve 3449, aubergine 8169, blue 3437, night 3438, blue 5770, sky 8170, anise green 6755, green 3450, green 3467, dark green 8171, ochre 8172, brown pink 3466, olive brown 3446, smoke 3447, brown 6785, neutral grey 3444, iron grey 8173, grey blue 3445, grey green 5661, black 5894.

Carrier materials which can be used in the context of the disclosure are polymeric substances, for example polymeric waxes, suitable to contain a dye substance, for example by adsorption or dissolution of the dye substance within the carrier material. The carrier material can be a homopolymer, a copolymer or a polymer blend. Any polymeric carrier materials which can be applied to the described method based on diffusion of the dye substance between the carrier material and the lens material and the proper process temperature as explained above can be used in combination with all lens materials and dye substances. Further, a skilled person will be able to determine a suitable carrier material considering the following restrictions.

The congealing point of the carrier material should be above the glass transition temperature of the lens material. The carrier material should be able to serve as a solvent for the dye of interest. Moreover, the composition comprising the carrier material should be easily removable from the substrate surface without damaging the substrate. Typically, the carrier material should be non-toxic and environmentally friendly to facilitate the handling of the carrier material as well as the disposal of used or excess carrier material.

The polymer characteristics, such as chain length, functionality, branching etc., should ensure
- strong and full adhesion to the substrate upon application of the pattern, for example by printing, and during the heating step;
- release of contained dye molecules without concurrent diffusion into the lens material (detectable by FTIR spectroscopy, for example) to avoid deterioration of substrate properties;
- if used in a hot melt printing process, high printing resolution by exhibiting appropriate physical properties such as viscosity and surface tension depending on the print head assembly used; and sufficient thermal stability in printing reservoir, i.e., no or negligible change of properties critical for the inkjet process.

Suitable examples of carrier materials are polyethylene waxes and polypropylene waxes. For example, the carrier material may comprise at least one material selected from the group consisting of oxidized polyethylene waxes, non-oxidized polyethylene waxes, oxidized polypropylene waxes and non-oxidized polypropylene waxes or consist of at least one material selected from the group consisting of oxidized polyethylene waxes, non-oxidized polyethylene waxes, oxidized polypropylene waxes and non-oxidized polypropylene waxes. Specific examples for carrier materials are the oxidized LDPE waxes Deurex EO 75 K, Deurex EO 76 K, Deurex EO 77 K, Deurex EO 78 K of the manufacturer Deurex AG with material properties as shown in Table 1.

TABLE 1

Material properties of oxidized LDPE waxes.

| Product name | Drop point [° C.] | Acid value [mg KOH/g] | Viscosity 140° C. [mPas] | Congealing point [° C.] |
| --- | --- | --- | --- | --- |
| EO 75 K | 110-113 | 5-9 | ≤20 | 94-98 |
| EO 76 K | 110-113 | 10-14 | ≤20 | 92-95 |
| EO 77 K | 100-110 | 15-19 | ≤20 | 86-90 |
| EO 78 K | 100-110 | 20-24 | ≤20 | 83-87 |

The carrier material can be hydrophobic. This enables good adhesion on the surface of the substrate and thus contributes to a tinting with high reproducibility. The composition can comprise a dye substance contained in the carrier material. For example, the dye substance can be dissolved in, dispersed in and/or adsorbed to the carrier material. In this case, the dye substance can be transferred from the carrier material into the lens material by diffusion.

This enables to actively tint the substrate with the dye in a locally resolved manner. As the dye diffuses into the substrate the tinting occurs in-substrate as a permanent tinting.

Typically, the composition can exhibit a uniform concentration of the dye substance throughout the composition. Thus, there is no need for preparing different compositions with different amounts or concentrations of the dye substance. A local resolution of the in-substrate tinting can be obtained by applying only a corresponding pattern of the composition.

It might be advantageous if the composition comprises a saturated dye loaded carrier material, i.e., if the carrier material is saturated with the dye substance. By using a saturated dye loaded carrier material, the diffusion rates of the dye from the composition into the lens material can be predicted more reliably leading to a tinting with enhanced reproducibility.

Moreover, the lens material can comprise a dye substance. In this case, the dye substance can be transferred from the lens material into the carrier material by diffusion, hereinafter also referred to as bleaching process.

This enables bleaching of the tinted substrate in a locally resolved manner. As the dye diffuses from the interior of the substrate into the carrier material the bleaching occurs in-substrate and a tinted substrate with a permanently bleached pattern, i.e., a locally resolved in-substrate tinted spectacle lens substrate, is receivable.

Both diffusion processes, i.e., diffusion of the dye substance from and into the substrate, can be combined, either within the same or in successive process steps. This allows for an enhanced locally resolved in-substrate tinting with different colors and/or patterns.

Typically, the pattern of the composition can be directly applied on the surface of the spectacle lens substrate. Auxiliary layers such as primer layers are not needed. Thus, the method is easily applicable and cost-effective to implement.

The method can be carried out in such a way that a tint gradient is obtained, for example by applying different amounts of dye substances per unit area on the spectacle lens substrate. For example, this can be done by locally printing several layers of the composition comprising the dye substance on top of each other.

In another exemplary embodiment, a tint gradient can be obtained by locally resolved heating, i.e., applying a heating pattern for influencing the diffusion process in such a way that a gradient can be obtained.

The possibility of creating gradients expands the spectrum of available locally resolved in-substrate tintings.

The method may comprise as further method steps, hereinafter referred to as masking procedure: providing a masking agent, applying a pattern of the masking agent on the surface of the spectacle lens substrate to obtain a partially masked spectacle lens substrate, immersing the partially masked spectacle lens substrate in a tinting bath comprising a dye substance, for example a solution of the dye substance, to allow for tinting unmasked areas of the partially masked spectacle lens substrate, taking the tinted, partially masked spectacle lens substrate out of the tinting bath and removing the masking agent from the surface of the tinted, partially masked spectacle lens substrate.

The masking procedure may be carried out before, concurrently or after the above explained steps relying on the diffusion principle. By employing the masking procedure, additional in-substrate tinting, for example with different dyes, is available.

The required properties of the masking agent depend on the lens material. The skilled person will be able to determine a suitable masking agent in view of the used lens materials considering the following restrictions.

The masking agent should sufficiently adhere to the substrate surface to avoid contact of the tinting bath with the substrate surface in the masked areas. Moreover, the masking agent should be easily removable from the substrate surface without damaging the substrate. If used simultaneously with the heating step, the masking agent should not alter its physical dimensions during heating to ensure high resolution. Thus, its congealing point should be above the heating temperature.

For example, the masking agent can be the composition comprising the carrier material, i.e., the composition can be used for the diffusion process of the dye substance to/from the lens material and as masking agent at the same time. The composition may only comprise the carrier material or the composition may comprise the carrier material and the dye substance. This enables high flexibility with regard to the locally resolved in-substrate tinting, e.g., different colors and/or patterns can be easily created in a single process with high reproducibility.

Typically, the pattern can be applied by inkjet printing. This applies to the pattern employed in the diffusion procedure as well as in the masking procedure. Inkjet printing allows the application of the pattern on the substrate surface with high resolution and reproducibility.

In case of using a composition comprising a dye substance contained in the carrier material the amount of dye substances per unit area of the substrate lens material can be easily pre-defined by selecting proper printing amounts (size of printing droplets, amount of printing passes, etc.). Thus, by selecting the printing features, the final look of the tinted spectacle lens substrate can exactly be determined even before the heating step. Moreover, inkjet printing can be easily automated.

In a specific development, the method may comprise preparing the composition. Thus, the method may comprise the following steps: providing a carrier material and a dye substance, heating the carrier material above its congealing point, dissolving the dye substance in the melted carrier material to obtain a dye loaded carrier material, and cooling the dye loaded carrier material to room temperature. In a further exemplary embodiment, the dye substance can be dissolved in the melted carrier material until saturation to obtain a saturated dye loaded carrier material.

Concerning the properties and selection of a suitable carrier material and dye substance as well as their advantages, reference is made to the above explanations describing the method for in-substrate tinting of a spectacle lens substrate.

The proposed method allows for easy and cost-effective preparation of the composition using usual apparatuses.

Optionally, the solution of the dye carrier can be filtrated to remove any dye particles that might be present. Thus, a high-quality composition can be obtained that can be used for in-substrate tinting of a spectacle lens substrate with high resolution and reproducibility. If used for a printing procedure such as inkjet printing, the filtration temperature should typically not be higher than the temperature used for printing to avoid the formation of precipitations in the print head.

According to a further aspect of the disclosure, a composition for in-substrate tinting, for example locally resolved in-substrate tinting, of a polymeric spectacle lens substrate is provided. The composition comprises a dye loaded carrier material. The carrier material comprises at least one material selected from the group consisting of oxidized polyethylene waxes, non-oxidized polyethylene waxes, oxidized polypropylene waxes, and non-oxidized polypropylene waxes. The composition allows for transferring the dye substance from the carrier material into a polymeric lens material by diffusion after applying the composition on a surface of a spectacle lens substrate comprising the lens material.

The composition can exhibit a uniform concentration of the dye substance throughout the composition.

Optionally, the composition may comprise a saturated dye loaded carrier material, i.e., a saturated solution of the dye substance in the carrier material.

Concerning the properties and selection of a suitable carrier material and dye substance as well as their advantages, reference is made to the above explanations describing the method for in-substrate tinting of a spectacle lens substrate.

According to a further aspect of the disclosure, a spectacle lens substrate comprising a polymeric lens material is provided. The spectacle lens substrate exhibits a pattern of a composition comprising a polymeric carrier material applied on a surface of the spectacle lens substrate. The composition may be directly applied on the surface of the spectacle lens substrate.

The carrier material comprises at least one material selected from the group consisting of oxidized polyethylene waxes, non-oxidized polyethylene waxes, oxidized polypropylene waxes, and non-oxidized polypropylene waxes. The composition allows for transferring a dye substance from the carrier material into the polymeric lens material and/or a dye substance from the lens material into the carrier material by diffusion upon heating the spectacle lens substrate.

Optionally, the congealing point Tc(carrier) of the polymeric carrier material may be above a glass transition temperature Tg(lens) of the polymeric lens material.

The composition can comprise a dye substance contained in the carrier material. The composition can exhibit a uniform concentration of the dye substance throughout the composition.

Such a spectacle lens substrate can be regarded as a precursor of a spectacle lens substrate with an in-substrate tinting obtainable by any one of the methods for in-substrate tinting of a spectacle lens substrate described above.

Concerning the properties and selection of suitable materials and methods for applying the pattern as well as their advantages, reference is made to the above explanations describing the method for in-substrate tinting of a spectacle lens substrate.

BRIEF DESCRIPTION OF THE DRAWINGS

Further features, properties, and advantages of the present disclosure will become clear from the following description of exemplary embodiments in conjunction with the accompanying drawings.

DESCRIPTION OF EXEMPLARY EMBODIMENTS

Each of the methods for in-substrate tinting of a spectacle lens substrate described herein supersedes the currently used tinting processes regarding spatial resolution allowing the portfolio of tinted lenses to be greatly extended using reliable and well-matured methods steps. The methods can be used for a variety of different polymeric spectacle lens substrate, for example with refractive indices of 1.50, 1.60 and 1.67, as well as a variety of dye substances. In addition to this, minimal efforts are needed for implementation into lens production as many process parameters are known from standard procedures and machines needed for lens-marking and in-substrate tinting are readily available.

Among others, the following applications can be realized by using the suggested methods for in-substrate tinting of a spectacle lens substrate:

Customer samples distributed to opticians with in-substrate tinted corporate identity markers (logo, etc.).

Productive customer orders (including "clear lenses") can be customized by in-substrate tinted logos.

Customizable free-form patterns allow for customer-specific darkening patterns if linked with calc-engine (i.e., for regional photophobia).

Freeform, multi-colored gradient lenses are available.

Marketing and cosmetic customization of spectacle lens substrates with different refractive indices.

Lens identification: In-substrate tinted characters can be recognized by OCR (optical character recognition) software, enabling the processes to be used for lens marking with identification data to the spectacle lens substrate.

Figure 1:
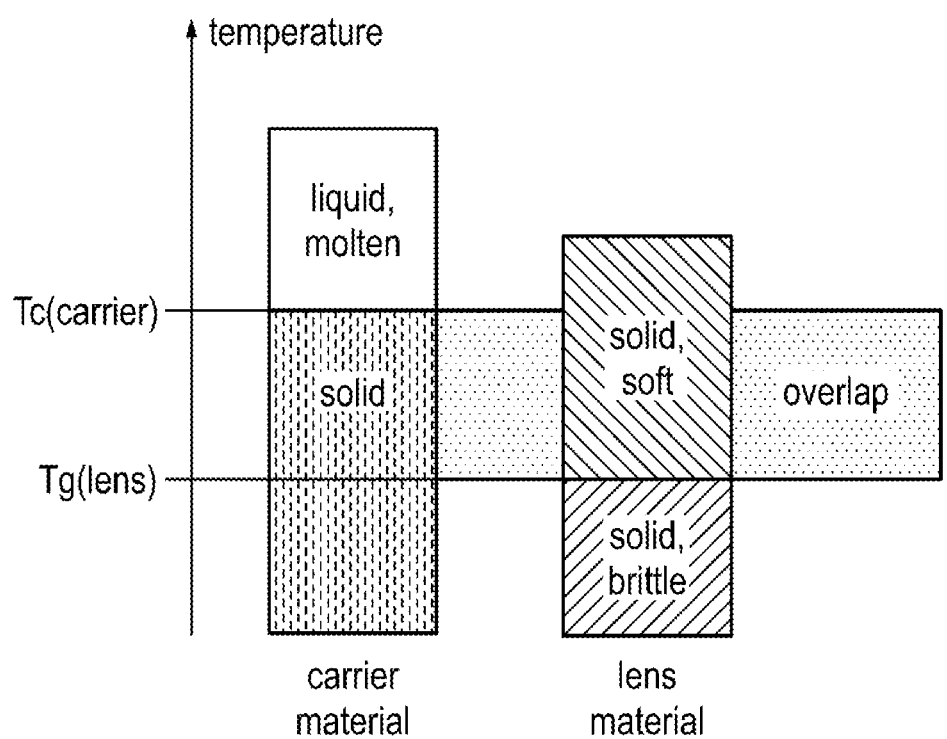
FIG. 1 illustrates the temperature-dependent physicochemical behavior of lens material and carrier material.

FIG. 1 shows the temperature-dependent physico-chemical behavior of the lens material 2 and carrier material 4 (dye-loaded and unloaded). With increasing temperature, the carrier material changes from solid state to liquid molten state above its congealing point Tc(carrier). The lens material likewise changes from the solid, brittle state (below its glass transition temperature Tg(lens)) to solid soft state (above its glass transition temperature Tg(lens)). At even higher temperature, the lens material may melt or decompose (not shown in FIG. 1).

To allow for fast-enough transfer of a dye substance 7 between the carrier material 4 and the lens material 2 by diffusion, a temperature within the designated "overlap" range, i.e., above the glass transition temperature Tg(lens) of the lens material 2, but below the congealing point Tc(carrier) of the carrier material 4 is typical.

In addition to the phase transitions depicted in FIG. 1, further phase transitions might occur, for example due to recrystallization.

A first exemplary embodiment of method 100 for in-substrate tinting is described below with reference to FIGS. 2 to 5. This first exemplary embodiment employs a composition 3 comprising a dye substance 7 contained in the carrier material 4. To obtain an in-substrate tinting, the dye substance 7 is transferred from the carrier material 4 into the lens material 2 by diffusion.

Figure 2:
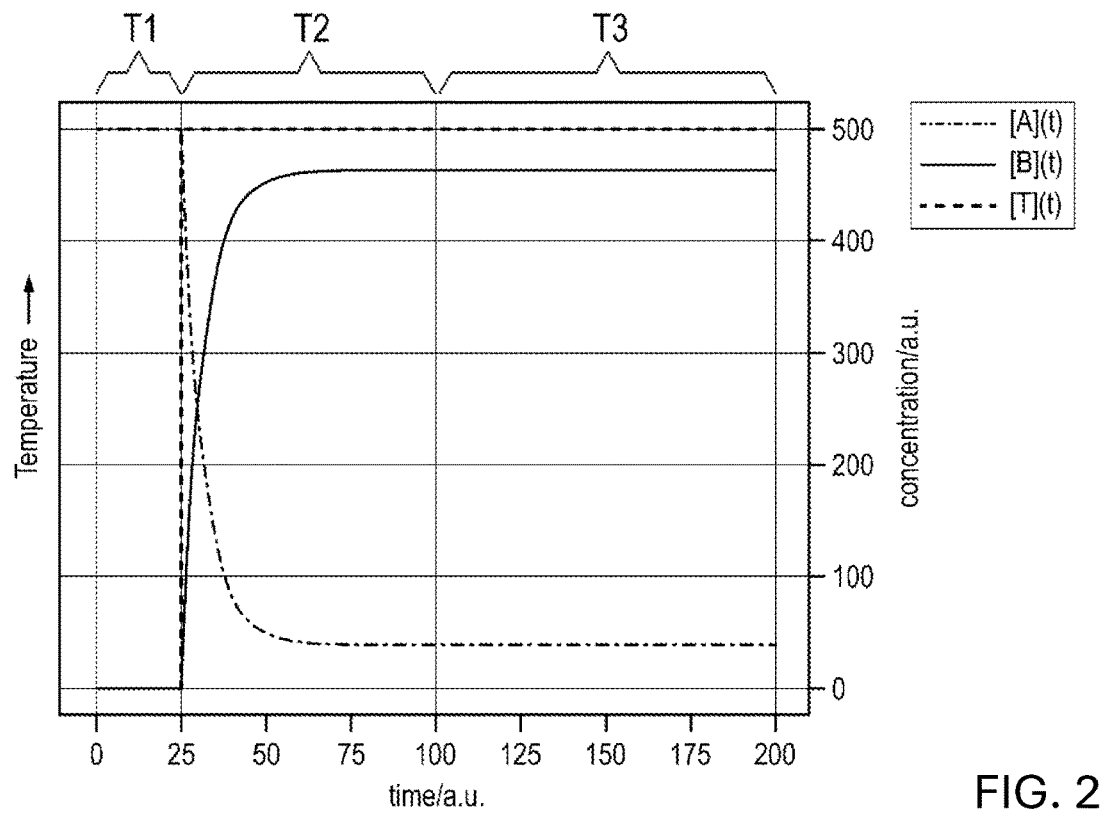
FIG. 2 illustrates the dye diffusion from the carrier material into the lens material dependent on temperature, time and concentration (two component system)

FIG. 2 illustrates the underlying diffusion processes in a two-component system, e.g., composition 3 is regarded as one component, the lens material 2 as the other component. The underlying driving force to make this process work is the systems' tendency to approach its thermodynamic equilibrium regarding the distribution of the dye substance 7 between the carrier material 4 and the lens material 2. The diffusion process can be influenced by selecting the proper starting conditions, e.g., difference in dye concentration/loading, and proper kinetic diffusion parameters, e.g., temperature, polymer hardness, etc. In the following two simplified, different scenarios, diffusion of the dye substance 7 dissolved in the carrier material 4 and diffusion of the dye substance 7 dispersed in the carrier material 4 are described.

The diagram depicted in FIG. 2 shows three time segments T1, T2, and T3, respectively.

In time segment T1, the composition 3 that comprises the dye-loaded carrier material 4, 7 is applied onto the surface 6 of the spectacle lens substrate 1. If the composition 3 is applied in a molten state, for example by inkjet printing, the temperature of the spectacle lens substrate 1 may locally rise above its Tg(lens), but this is negligible since the average temperature of the spectacle lens substrate 1 is still below its Tg(lens). This results in a situation where the molecules of the dye substance 7 contained in the carrier material 4 would like to penetrate (thermodynamically) the surface 6 of the spectacle lens substrate 1 but are kinetically hindered (infinitely slow). The composition 3 solidifies on the surface 6.

After a certain time period, time segment T2 is reached. In time segment T2, the spectacle lens substrate 1 is heated up to a temperature T above the glass transition temperature Tg(lens) but below the congealing point Tc(carrier). Diffusion coefficients of the dye substance 7 within the carrier material 4 as well as within the lens material 2 are increased by orders of magnitude. The kinetic hindrance of the system approaching its equilibrium state is reduced and dye molecules penetrate from the carrier material 4 into the lens material 2. The concentration of the dye substance 7 in the carrier material 4 dependent on the time t is shown by curve [A] (t). The concentration of the dye substance 7 in the lens material 2 dependent on the time t is shown by curve [B] (t).

After a certain time period, time segment T3 is reached. In time segment T3, the system has approached its equilibrium state and further time given for diffusion has negligible impact on dye-uptake and thus negligible influence on spectral properties of the tinted lens material 2, 7. Diffusion of the dye substance 7 within the lens material 2 continues at elevated temperature above the glass transition temperature Tg(lens) of the lens material 2. Thus, the lens material 2 should be cooled below its Tg(lens) if avoidance of further dye diffusion is required.

In the scenario with two components as shown in FIG. 2, a high concentration of the dye substance 7 in the carrier material 4 is desired for fast transfer of the dye substance 7.

If, however, the dye substances 7 is not dissolved in the carrier material 4 but adsorbed to or dispersed within the carrier material 4 the whole system can be regarded as a three component system (carrier material 4, reservoir of the dye substance 7 and lens material 2). In this case, a low maximum dye concentration in the carrier material 4 and fast kinetics might be advantageous. For this process, a carrier material 4 with lower affinity (activity) towards the dye substance 7 can be beneficial.

Figure 3:
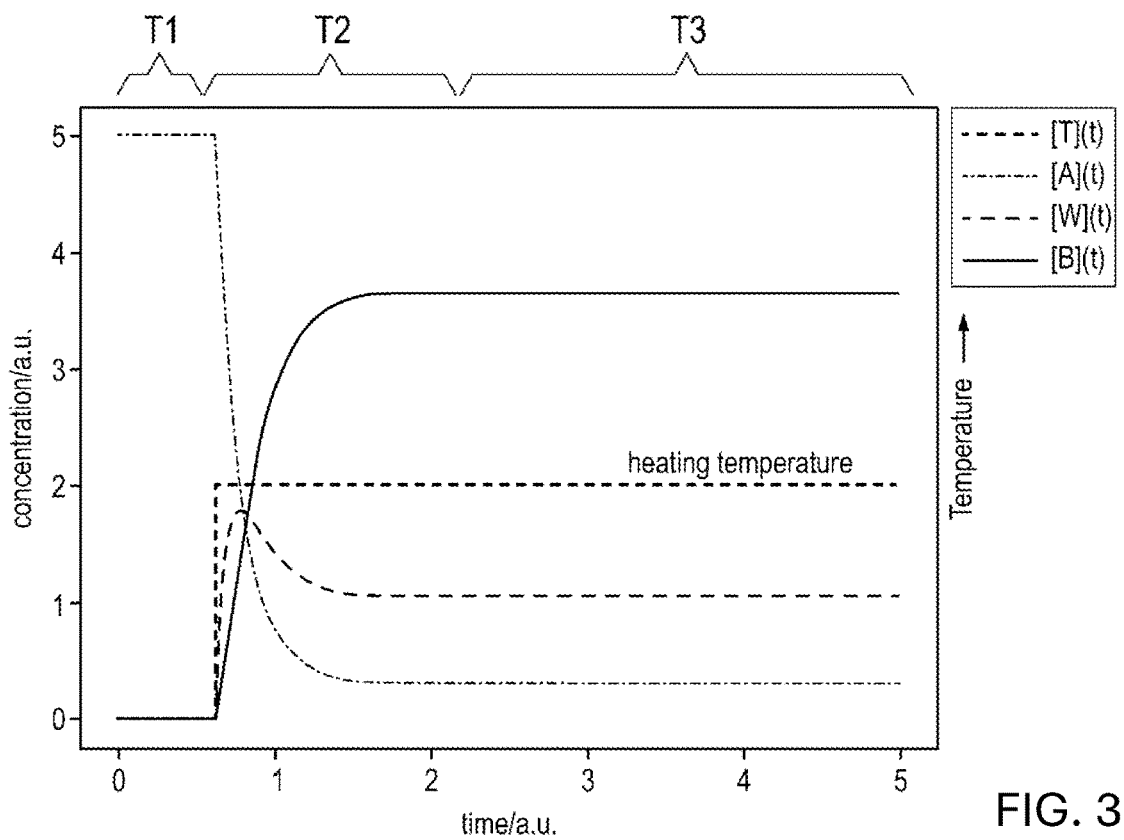
FIG. 3 illustrates the dye diffusion from the carrier material into the lens material dependent on temperature, time and concentration (three component system)

FIG. 3 illustrates the underlying diffusion processes in a three-component system. As in FIG. 2, it can be distinguished between three time segments T1, T2 and T3.

Time segment T1 is the initial state with low temperature, that is a temperature below the glass transition temperature Tg(lens) of the lens material 2 and the congealing point Tc(carrier) of the carrier material 2. The average temperature of the spectacle lens substrate 1 is still below its Tg(lens).

In time segment T2, the spectacle lens substrate 1 is heated up to a temperature T above the glass transition temperature Tg(lens). The carrier material 4 exhibits a congealing point Tc(carrier) above this heating temperature. Diffusion coefficients of the dye substance 7 within the carrier material 4 as well as within the lens material 2 are increased by orders of magnitude, but are still different as can be conclude from the different course of the curves [W](t) showing the concentration of the dye substance 7 in the dye reservoir dependent on the time t and [B](t) showing the concentration of the dye substance 7 in the lens material 2 dependent on the time t. In time segment T3, the system approaches its equilibrium state. As in FIG. 2, the concentration of the dye substance 7 in the carrier material 4 dependent on the time t is shown by curve [A] (t).

Figure 4:
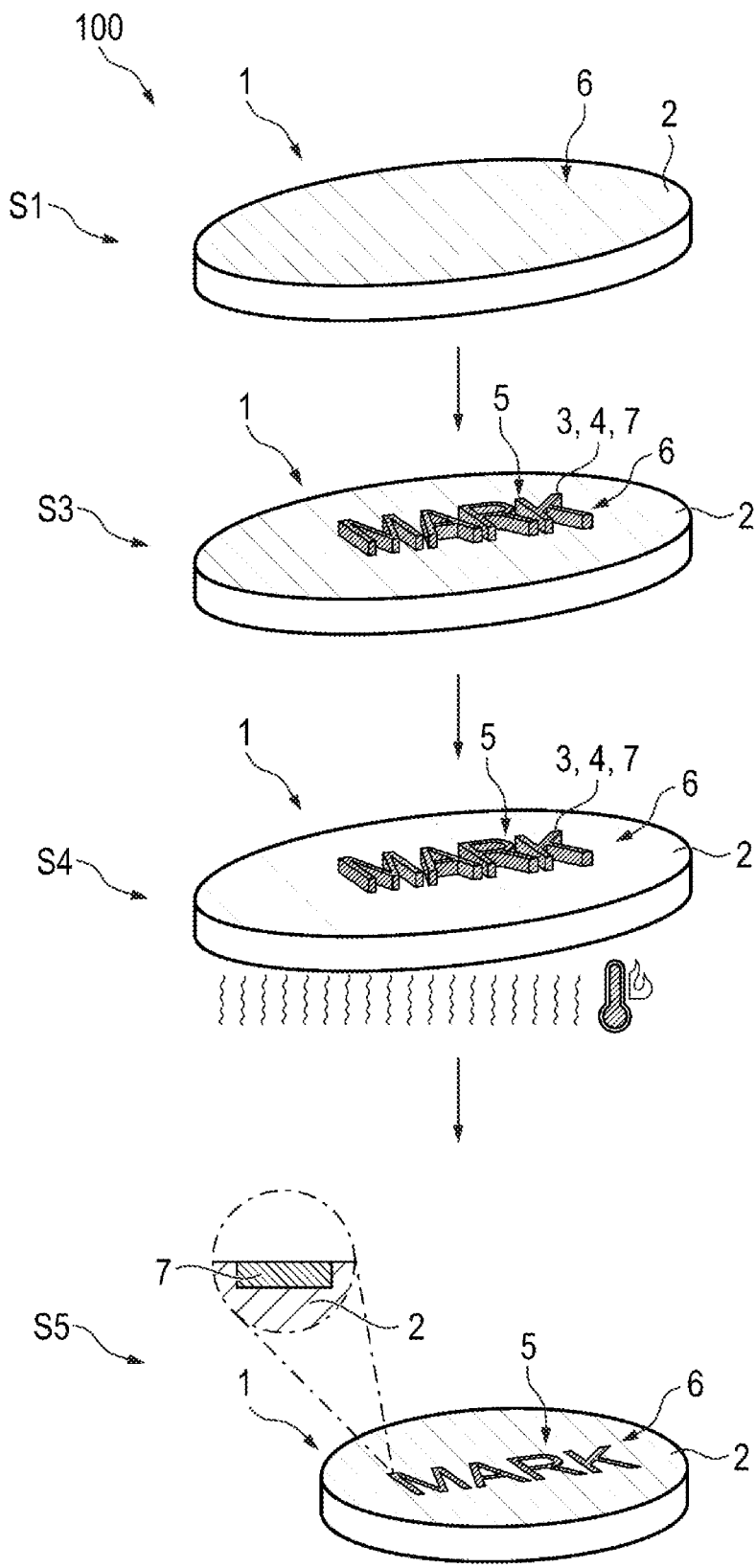
FIG. 4 illustrates a method for in-substrate tinting of a spectacle lens substrate with dye diffusion from the carrier material into the lens material.

FIG. 4 illustrates a method 100 for in-substrate tinting, in particular locally resolved in-substrate tinting, of a spectacle lens substrate 1 with dye diffusion from the carrier material 4 into the lens material 2.

In step S1, a spectacle lens substrate 1 is provided. The spectacle lens substrate 1 comprises a polymeric lens material 2. In a specific example, the lens material 2 is poly(allyl diglycol carbonate) or poly(thiourethane) with refractive indices of 1.50, 1.60 or 1.67. Method 100 does not require any specific coating or material on the surface 6 of the spectacle lens substrate 1. However, the surface 6 might be cleaned prior to the next steps by common cleaning methods.

Moreover, a swelling agent can be applied on the surface 6 of the spectacle lens substrate 1, for example by immersing the whole spectacle lens substrate 1 in a bath comprising a swelling agent or consisting of a swelling agent. Possible swelling agents are water, for example for the use with poly(allyl diglycol carbonate), and benzylic alcohol, for example for the use with poly(thiourethane). The swelling agent might facilitate the diffusion of the dye substance 7 into the spectacle lens substrate 1.

Figure 5:
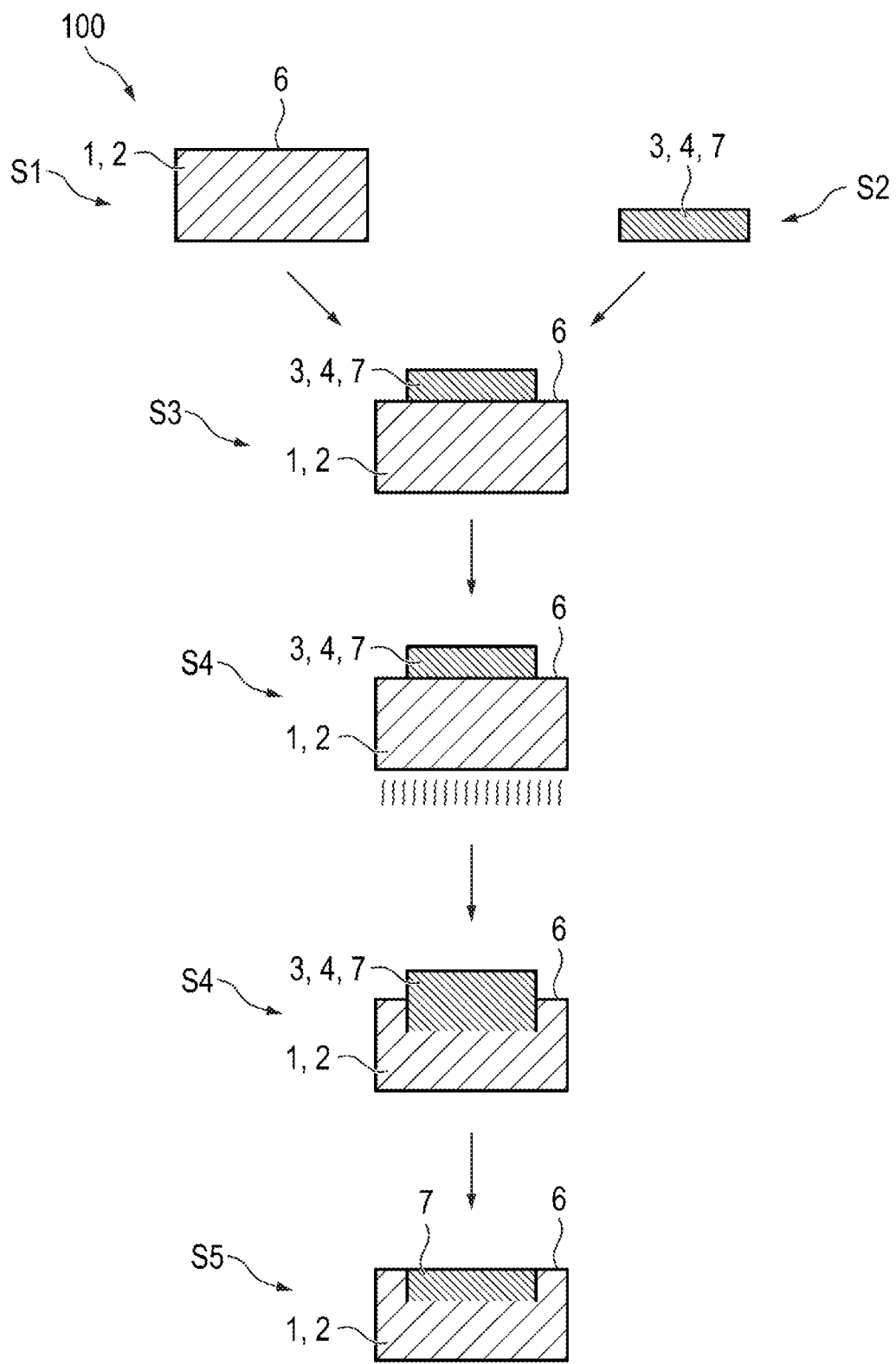
FIG. 5 shows a 2D/cut view of the tinting process using a dye loaded carrier material.

In step S3, a pattern 5 that is depicted with the letters "MARK" in FIG. 4 and FIG. 5 of a composition 3 is applied on the surface 6 of the spectacle lens substrate 1. The composition 3 is provided in step S2 (see FIG. 5) and comprises a polymeric carrier material 4 and a dye substance 7 contained in the carrier material 4. In the specific example, the polymeric carrier material 4 is an oxidized polyethylene wax. For example, one of the oxidized LDPE wax Deurex EO 75 K, Deurex EO 76 K, Deurex EO 77 K or Deurex EO 78 K of the manufacturer Deurex AG can be employed. The congealing point Tc(carrier) of the carrier material 4 is above the glass transition temperature Tg(lens) of the lens material 2. The dye substance 7 used in the specific examples was one of Dianix Yellow AM-42, Serilene Scarlet G-LS, Dianix Turquoise S-BG and Terasil Blue 3 RL-01.

The pattern 5 can be applied by inkjet printing. In a specific example, an X-Cube digital lens inking device from the manufacturer Tecoptique was used for inkjet printing. This device allows to print patterns 5 on any type of lenses. However, other printing devices could be used as well. The X-Cube device can either be used in a manual mode or an automatic mode allowing for automating of the method 100. Printing characteristics of the X-Cube can be found in Table 2.

TABLE 2

X-Cube printing characteristics.

| | |
|---|---|
| Type of lenses | Polycarbonate, mineral |
| Carrier Color | Yellow |
| Positioning | Manual/Assist/Automatic |
| Printing resolution | 300/360/600/900/1200 dpi |
| Print design | Single image or composed image files |
| Design editor | CorelDraw/Adobe Photoshop/Paint |
| Cleaning process | Cotton cloth with isopropyl alcohol |
| Carrier | Solvent-free, pigmented hot melt carrier |
| Lens diameter | Edged lenses and uncut up to 90 mm |
| Lenses characteristic | −16 to +16 |
| | White, tinted, polar, hydrophobic, oleophobic, AR-, hard coating, uncoated |

The X-Cube device was used with a M-series industrial piezo carrier jet printhead manufactured by Xerox, corp (Xerox M1). This print head is ideal for high demand application and can jet fluids within a temperature range from ambient to 140° C. The characteristics of the print head can be found in Table 3.

TABLE 3

M-series print head characteristics.

| Operating Parameters | Unit of Measure | Xerox M-Series |
|---|---|---|
| Number of addressable jets | | 880 |
| 4 Color (closest) nozzles spacing | microns (dpi) | 337.5 (75) |
| Single color nozzle spacing | microns (dpi) | 84.4 (300) |
| Rows of nozzles | | 16 |
| Meniscus pressure | mbar | −3 to −8 |
| Drop size | picoliters | 15 to 30 |
| Nominal drop velocity | m/s | up to 10 |
| Operating temperature max | oC | 140 |
| Fluid viscosity | cP | 6 to 11 |
| Maximum operating frequency | kHz | 43 kHz |

The printing distance, i.e., the distance between the surface 6 and the print head was chosen between 0.5 to 3 mm, the printing resolution was 900 dpi with 3 printing passes. However, the printing resolution as well as the amount of printing passes can be varied, e.g., between 25 to 1200 dpi and 1 to 10 passes, respectively. The printing temperature was between 120° C. to 140° C.

Referring again to FIG. 4, method 100 continues with step S4 wherein the spectacle lens substrate 1 is heated to a temperature above the glass transition temperature Tg(lens) of the lens material 2 and below the congealing point Tc(carrier) of the carrier material 4 with a heating device, for example in an air oven. The spectacle lens substrate 1 may for instance be heated to a temperature between 40° C. and 100° C., typically between 70° C. and 100° C.

The heating temperature in the specific example was about 90° C. for a time period from 20 minutes to several hours, depending on the desired tint intensity, i.e., until the spectacle lens substrate 1 has attained the desired tint. The heating allows for diffusion of the dye substance 7 from the carrier material 4 into the lens material 2, i.e., the dye substance 7 is transferred from the carrier material 4 into the lens material 2.

After heating, the residual composition 3 is removed from the surface 6 of the spectacle lens substrate 1 (step S5). This may be done by wiping, e.g., with paper towels, or washing in presence of ethanol, isopropanol, acetone or any solvent that dissolves the composition 3 but does not penetrate the spectacle lens substrate 1. Rinsing may be combined with ultrasonic cleaning in an ophthalmic lens washing machine. The ultrasonic bath may be heated.

After removing the composition 3 from the surface 6, a spectacle substrate lens 1 with a locally resolved in-substrate tinting (letters "MARK" in step S5) is obtained. The dye substance 7 is diffused into the surface 6 as shown in the enlargement of FIG. 4. Thus, the obtained tinting is located in-substrate and provides for a permanent locally resolved tint.

FIG. 5 shows steps S1 to S5 of method 100 of the first exemplary embodiment in a 2D/cut view to better illustrate the diffusion of the dye substance 7 into the spectacle lens substrate 1. For further explanation, it is referred to the description of FIG. 4.

A second exemplary embodiment of method 100 for in-substrate tinting, in particular locally resolved in-substrate tinting, is described below with reference to FIGS. 6 to 8. In this second exemplary embodiment, the lens material 2 comprises the dye substance 7. To obtain a in-substrate tinting, the dye substance 7 is transferred from the lens material 2 into the carrier material 4 by diffusion. The spectacle lens substrate 1 is bleached locally resolved, for example pixel-wise.

Figure 6:
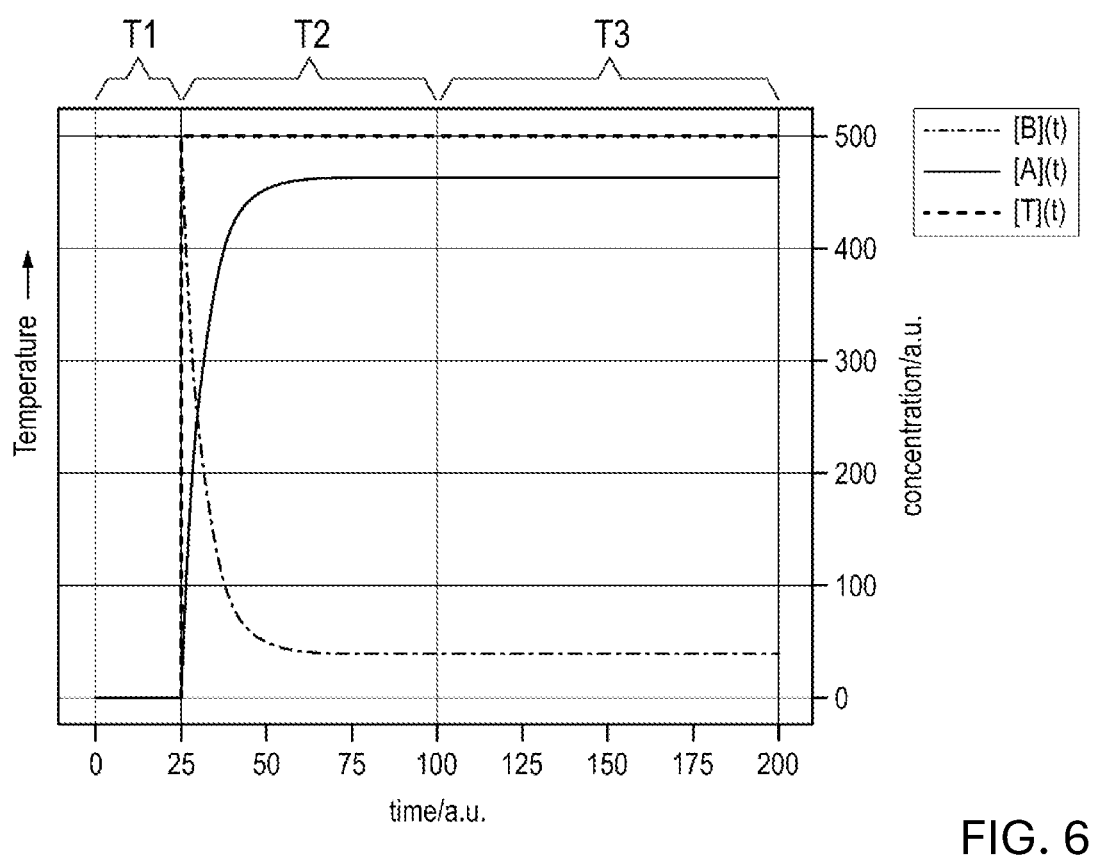
FIG. 6 illustrates the dye diffusion from the lens material into the carrier material dependent on temperature, time and concentration.

FIG. 6 illustrates the relevant diffusion processes. The underlying chemical and physical principles used in the first exemplary embodiment are relevant for the second exemplary embodiment as well. Again, the system's drive towards an equilibrium state of the dye substance 7 between carrier material 4 and lens material 2 is made use of. In contrast to the first exemplary embodiment, the starting conditions differ in that a dye-free carrier material 4 and a pre-dyed spectacle lens substrate 1 are used.

The diffusion process can be influenced by selecting the proper starting conditions, e.g., difference in dye concentration/loading, and proper kinetic diffusion parameters, e.g., temperature, polymer hardness, etc.

The diagram depicted in FIG. 6 shows three time segments T1, T2, and T3, respectively.

In time segment T1, the composition 3 that comprises the dye-free carrier material 4 is applied onto the surface 6 of the spectacle lens substrate 1. If the composition 3 is applied in a molten state, for example by inkjet printing, the temperature of the spectacle lens substrate 1 may locally rise above its glass transition temperature Tg(lens), but this is negligible as the average temperature of the spectacle lens substrate 1 is still below its Tg(lens). This results in a situation where the molecules of the dye substance 7 contained in the lens material 2 would like to penetrate (thermodynamically) the surface 6 of the spectacle lens substrate 1 but are kinetically hindered (infinitely slow). The composition 3 solidifies on the surface 6.

After a certain time period, time segment T2 is reached. In time segment T2, the spectacle lens substrate 1 is heated up to a temperature T above the glass transition temperature Tg(lens). The carrier material 4 exhibits a congealing point Tc(carrier) above this heating temperature T. Diffusion coefficients of the dye substance 7 within the lens material 2 as well as within the carrier material 4 are increased by orders of magnitude. The kinetic hindrance of the system approaching its equilibrium state is reduced and dye molecules penetrate from the lens material 2 into the carrier material 4. The concentration of the dye substance 7 in the carrier material 4 dependent on the time t is shown by curve [A] (t).

The concentration of the dye substance 7 in the lens material 2 dependent on the time t is shown by curve [B] (t).

After a certain time period, time segment T3 is reached. In time segment T3, the system has approached its equilibrium state and further time given for diffusion has negligible impact on dye-uptake and thus negligible influence on spectral properties of the spectacle lens substrate 1. Diffusion of the dye substance 7 within the lens material 2 continues at elevated temperature above the glass transition temperature Tg(lens) of the lens material 2. Thus, the lens material 2 should be cooled below its Tg(lens) if avoidance of further dye diffusion is required.

In the second exemplary embodiment, bleaching does not yield a completely dye-free lens material 2 as at elevated temperature dye-diffusion towards the surface 6 and diffusion of the dye substance 7 within the lens substrate take place in parallel. However, due to favorable bleaching kinetics (k_bleach>>k_bulk diffusion) and a proper choice of process temperatures the remaining dye substance 7 in the lens material 2 is negligible for its optical properties. Technically, this can be ensured by preparing pre-dyed spectacle lens substrates 1 that shall be bleached later in a way that the dye substance 7 is contained in the very first microns of depth. This can be achieved by a comparably low temperature during pre-dyeing (tinting). The pre-dyed spectacle lens substrates 1 can then easily be bleached as described above. The diffusion depth of the remaining dye substance 7 in the lens material 2 can be increased by an oven cycle at higher temperature, if necessary.

Figure 7:
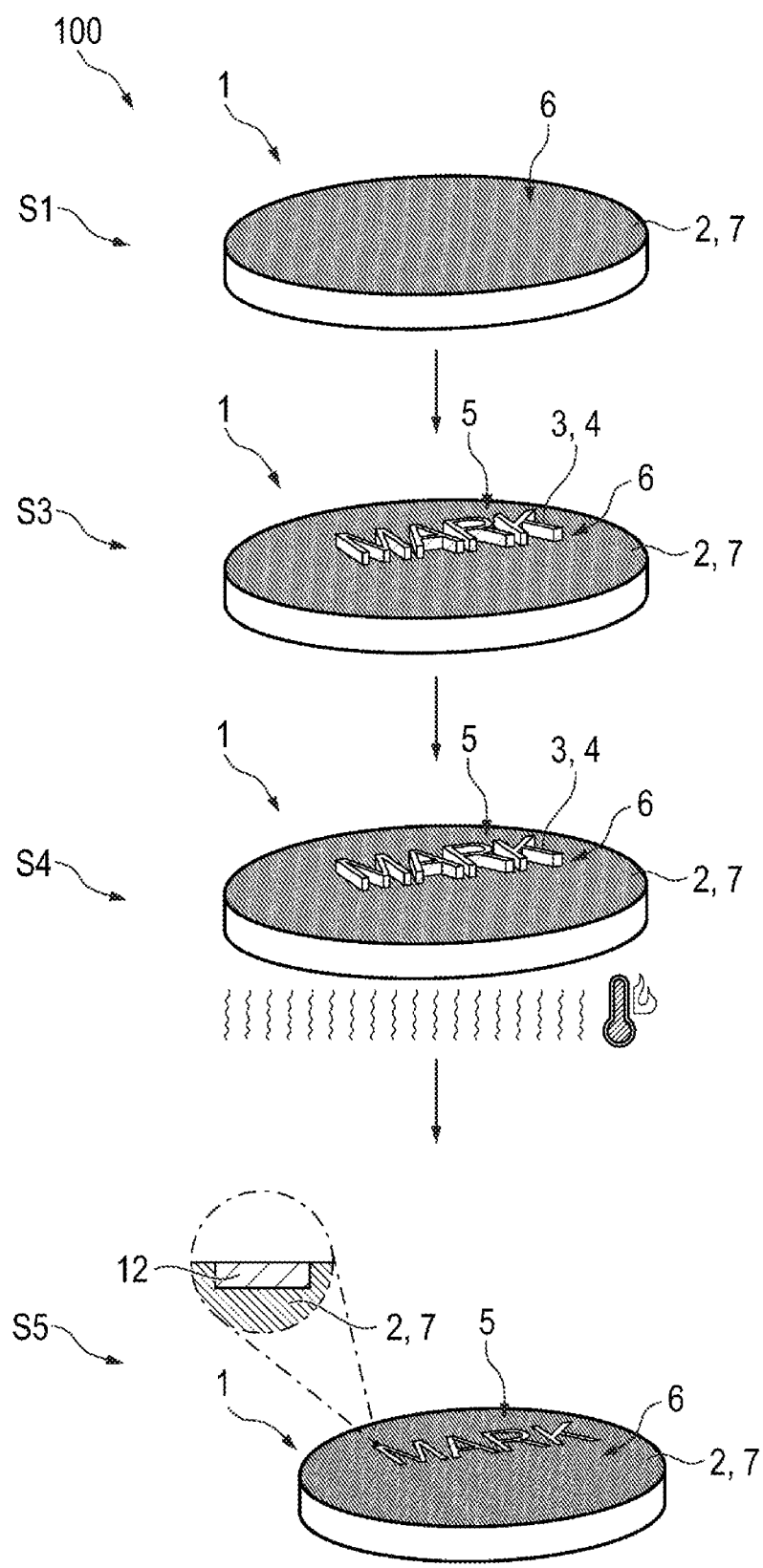
FIG. 7 illustrates a method for in-substrate tinting of a spectacle lens substrate with dye diffusion from the lens material into the carrier material.

FIG. 7 illustrates a method 100 for in-substrate tinting, in particular locally resolved in-substrate tinting, of a spectacle lens substrate 1 with dye diffusion from the lens material 2 into the carrier material 4 (bleaching process).

In step S1, a spectacle lens substrate 1 is provided. The spectacle lens substrate 1 comprises a polymeric lens material 2. In a specific example, the lens material 2 is poly(allyl diglycol carbonate) or poly(thiourethane) with refractive indices of 1.50, 1.60 or 1.67. The lens material 2 contains a dye substance 7, i.e., a pre-dyed spectacle lens substrate 1 is used. The dye substance 7 used in the specific examples was one of Dianix Yellow AM-42, Serilene Scarlet G-LS, Dianix Turquoise S-BG and Terasil Blue 3 RL-01. The pre-dyed spectacle lens substrate 1 is obtainable by well-known tinting process using a tinting bath.

Method 100 does not require any specific coating or material on the surface 6 of the spectacle lens substrate 1. However, the surface 6 might be cleaned prior to the next steps by common cleaning methods.

Figure 8:
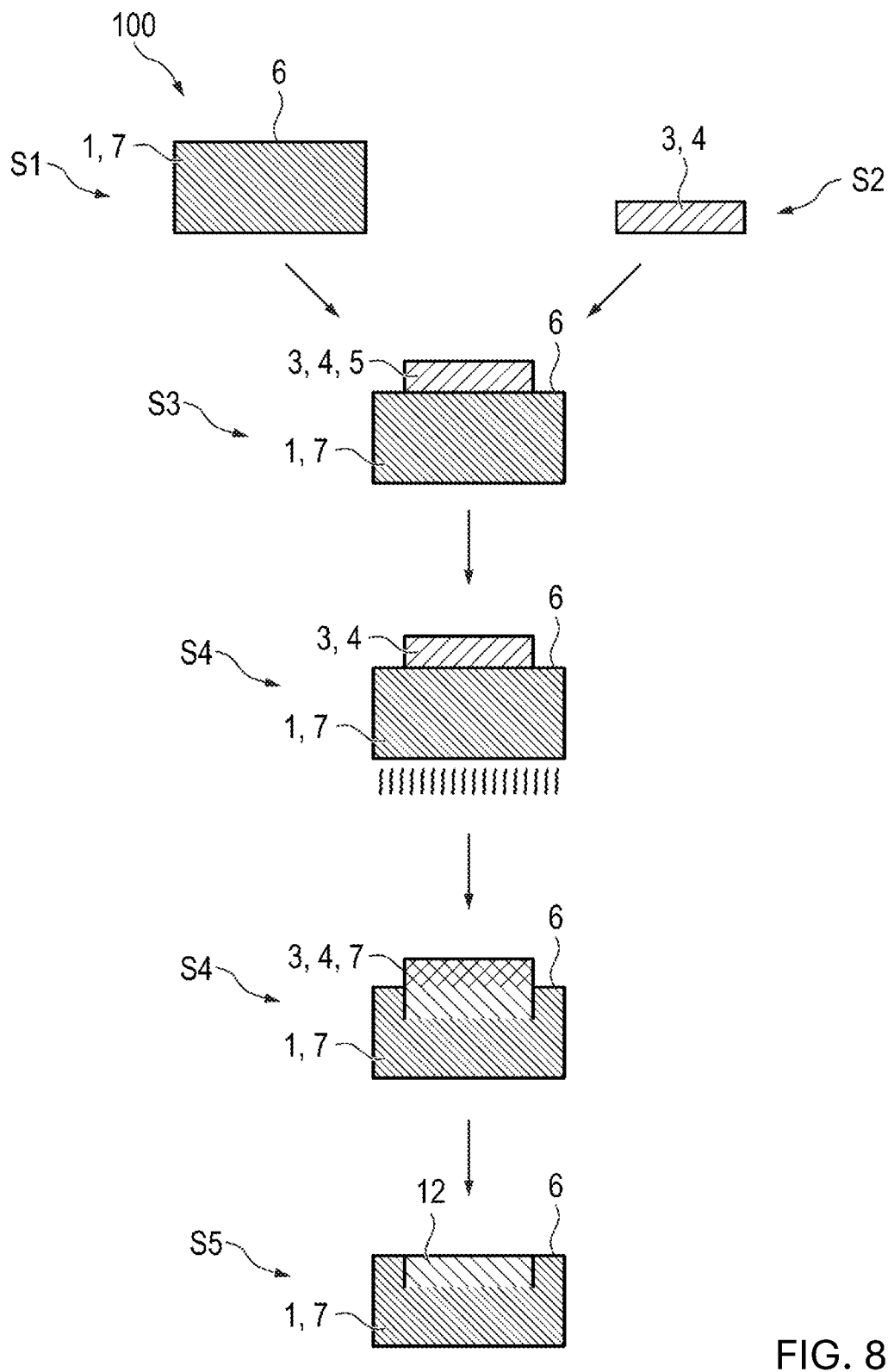
FIG. 8 shows a 2D/cut view of the pixel-wise in-substrate bleaching process.

In step S3, a pattern 5 that is depicted with the letters "MARK" in FIG. 7 and FIG. 8 of a composition 3 is applied on the surface 6 of the spectacle lens substrate 1. The composition 3 is provided in step S2 (see FIG. 8) and comprises a polymeric carrier material 4, but no dye substance 7. In the specific example, the polymeric carrier material 4 is an oxidized polyethylene wax. For example, one of the oxidized LDPE wax Deurex EO 75 K, Deurex EO 76 K, Deurex EO 77 K or Deurex EO 78 K of the manufacturer Deurex AG can be employed. The softening point Ts(carrier) of the carrier material 4 is above the softening point Ts(lens) of the lens material 2. The congealing point Tc(carrier) of the carrier material 4 is above the glass transition temperature Tg(lens) of the lens material 2.

The pattern 5 can be applied by inkjet printing. For usable printing equipment it is referred to the description of the first exemplary embodiment together with Tables 2 and 3.

Method 100 continues with step S4 wherein the spectacle lens substrate 1 is heated to a temperature above the glass transition temperature Tg(lens) of the lens material 2 but below the congealing point Tc(carrier) of the carrier material 4 with a heating device, for example in an air oven. The spectacle lens substrate 1 may for instance be heated to a temperature between 40° C. and 100° C., typically between 70° C. and 100° C.

The heating temperature in the specific example was about 90° C. for a time period from 1 minute to 1 day, depending on the desired bleaching intensity, i.e., until the spectacle lens substrate 1 has attained the desired bleaching. The heating allows for diffusion of the dye substance 7 from the lens material 2 into the carrier material 4, i.e., the dye substance 7 is transferred from the lens material 2 into the carrier material 4.

After heating, composition 3 comprising the carrier material 4 and some dye substance 7 is removed from the surface 6 of the spectacle lens substrate 1 (step S5). This may be done by wiping, e.g., with paper towels, or washing in presence of ethanol, isopropanol, acetone or any solvent that dissolves the composition 3, but does not penetrate the spectacle lens substrate 1. Rinsing may be combined with ultrasonic cleaning in an ophthalmic lens washing machine. The ultrasonic bath may be heated.

After removing the composition 3 from the surface 6, a spectacle substrate lens 1 with a locally resolved in-substrate tinting (letters "MARK" in step S5) is obtained. The dye substance 7 was locally removed from the pre-dyed spectacle lens substrate 1 as shown in the enlargement of FIG. 7. Thus, the obtained bleaching is located in-substrate and provides for a permanent locally-resolved tint.

FIG. 8 shows steps S1 to S5 of method 100 of the second exemplary embodiment in a 2D/cut view to better illustrate the diffusion of the dye substance 7 from the spectacle lens substrate 1 into the carrier material 4. For further explanation, it is referred to the description of FIG. 7.

The first and second exemplary embodiments may be combined, i.e., tinting according to the first exemplary embodiment and bleaching according to the second exemplary embodiment may be done successively or overlapping in time.

Figure 9:
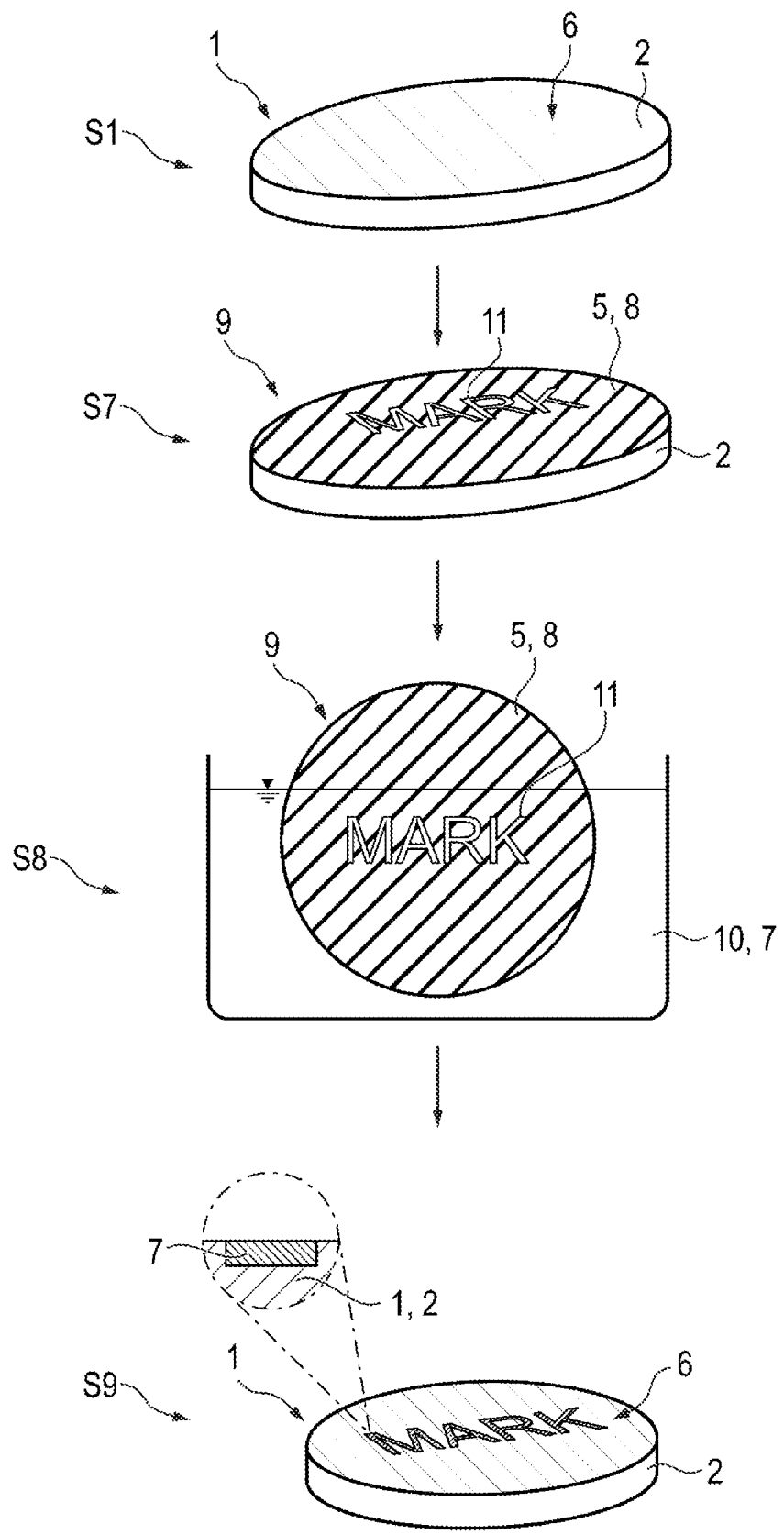
FIG. 9 illustrates a masking procedure.
Figure 10:
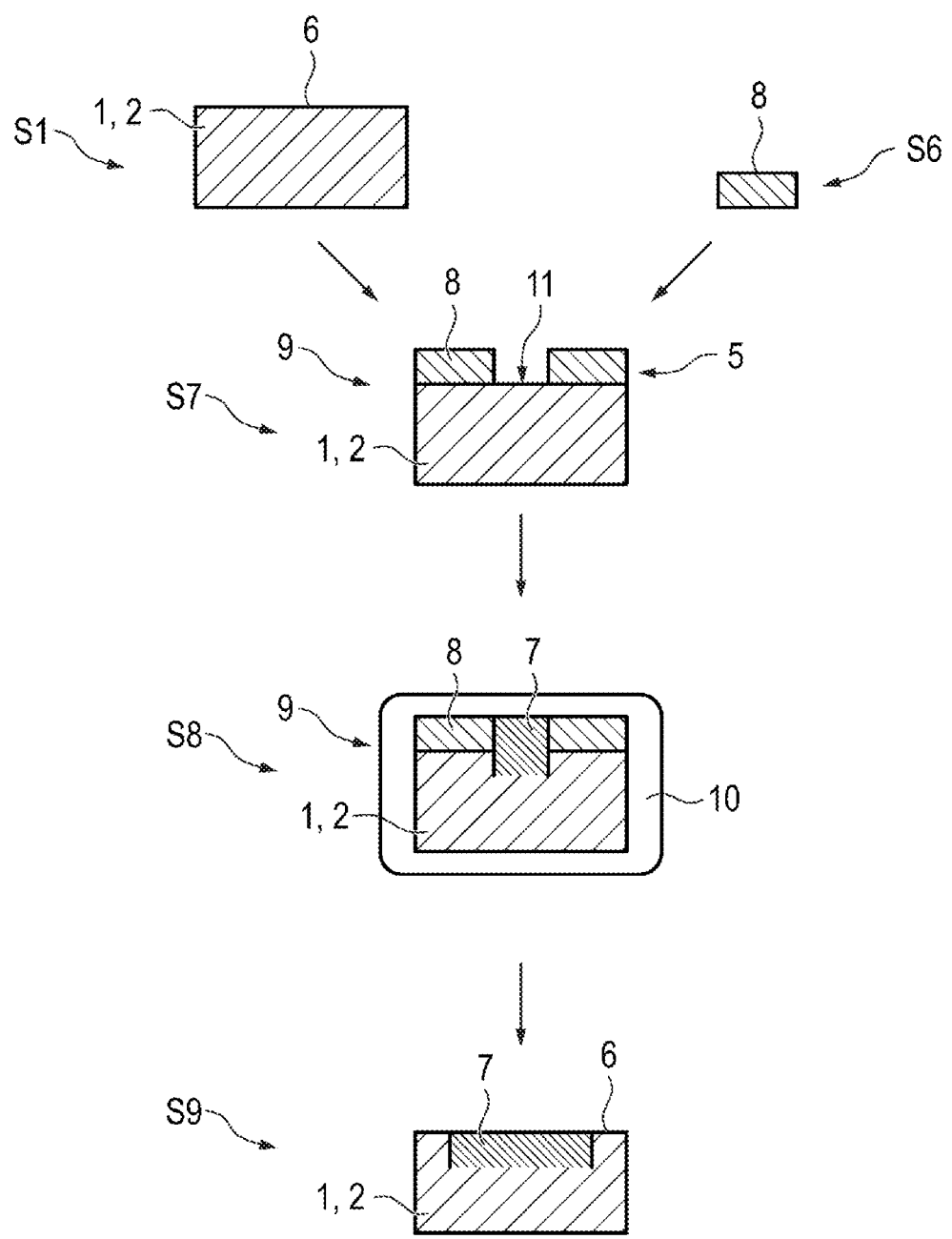
FIG. 10 shows a 2D/cut view of the lens tinting using the masking procedure.

FIGS. 9 and 10 illustrate a masking procedure of a third exemplary embodiment of the disclosure. The masking procedure can be combined with one or both of the methods 100 of the first and second exemplary embodiment, respectively, that can be carried out either before or after or (partly) overlapping with the steps described with reference to FIGS. 9 and 10.

In step S1, a spectacle lens substrate 1 is provided. The spectacle lens substrate 1 comprises a polymeric lens material 2. In a specific example, the lens material 2 is poly(allyl diglycol carbonate) or poly(thiourethane) with refractive indices of 1.50, 1.60 or 1.67. Method 100 does not require any specific coating or material on the surface 6 of the spectacle lens substrate 1. However, the surface 6 might be cleaned prior to the next steps by common cleaning methods. The spectacle lens substrate 1 may have already been treated according to the first and/or second exemplary embodiment.

In step S7, a pattern 5 of a masking agent 8 is applied on the surface 6 of the spectacle lens substrate 1. The masking agent 8 is provided in previous step S6 (see FIG. 10). The pattern 5 leaves an unmasked area 11 of the surface 6 free from the masking agent 8. In FIGS. 9 and 10, the lettering "MARK" corresponds to the unmasked area 11. The pattern 5 can be applied by inkjet printing. For usable printing equipment it is referred to the description of the first exemplary embodiment together with tables 2 and 3. At the end of step S7, a partially masked spectacle lens substrate 9 is obtained.

In step S8, the partially masked spectacle lens substrate 9 is immersed in a tinting bath 10 that comprises a dye substance 7. The partially masked spectacle lens substrate 9 is allowed to stay in the tinting bath 10 until the desired tint is obtained. This may last several minutes to several hours.

In step S9, the tinted, partially masked spectacle lens substrate 9 is taken out of the tinting bath 10 and the masking agent 8 is removed from the surface of the tinted, partially masked spectacle lens substrate 9. The latter may be done by wiping, e.g., with paper towels, or washing in presence of ethanol, isopropanol, acetone or any solvent that dissolves the masking agent 8, but does not penetrate the spectacle lens substrate 1. Rinsing may be combined with ultrasonic cleaning in an ophthalmic lens washing machine.

FIG. 10 shows steps S1 and S6 to S9 of method 100 of the third exemplary embodiment in a 2D/cut view to better illustrate the masking procedure. For further explanation, it is referred to the description of FIG. 9.

Figure 11:
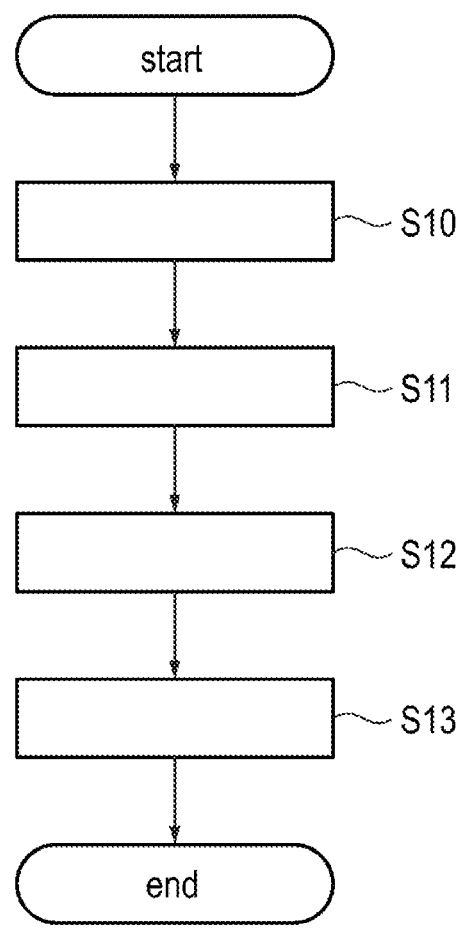
FIG. 11 is a flowchart illustrating a method for preparing a composition for in-substrate tinting of a polymeric spectacle lens substrate.

FIG. 11 shows a flowchart that illustrates a method 200 for preparing a composition 3 for in-substrate tinting, in particular locally resolved in-substrate tinting, of a polymeric spectacle lens substrate 1. During the first step S10, a carrier material 4 and a dye substance 7 are provided.

In a specific example, the carrier material 4 is an oxidized emulgated polyethylene wax named Deurex EO 78 K of the manufacturer Deurex AG which was purified by consecutive liquid-liquid extraction before further use. As dye substance 7, Terasil Blue 3 RL-01 was used.

During step S11, the carrier material 4 is heated above its congealing point. In step S12 the dye substance 7 is dissolved in the melted carrier material 4. At the end of step S12, a dye loaded carrier material 4, 7 is obtained. Steps S11 and S12 can be combined and the dye loaded carrier material 4, 7 may be purified. In step S13, the dye loaded carrier material 4, 7 is cooled to room temperature.

In the specific example, 10 wt % (weight percent) Terasil Blue 3 RL-01 and 90 wt % Deurex EO 78 K were mixed in a beaker, heated up to 120° C. at atmospheric pressure and stirred for 24 h. Then, the mixture was hot filtered at 120° C. to remove remaining particles of the dye substance 7. The filtration temperature should not be higher than the temperature used for printing to avoid precipitation of solids in the print head. After filtration, the molten, dye-loaded carrier material 4, 7 was cast onto aluminum foil for solidification. The solidified dye-loaded carrier material 4, 7 was broken into pieces by hand.

The prepared dye-loaded carrier material 4, 7 is brittle at room temperature and exhibits a melting point of 85° C. The maximum particle size is about 40 μm. It is non-toxic and of dark green color (dye dependent).

The obtained dye-loaded carrier material 4, 7 can now be loaded into a print head assembly to carry out a method 100 for in-substrate tinting of a spectacle lens substrate 1, wherein the composition 3 comprises a dye substance 7 contained in the carrier material 4 and wherein the dye substance 7 is transferred from the carrier material 4 into the lens material 2 by diffusion, for example the method 100 described with respect to FIGS. 4 and 5.

If needed, a quick feasibility test can be performed by manually applying some dye-loaded carrier material 4, 7 onto spectacle lens substrates 1 and heating them up to 90° C. After about 30 minutes at 90° C., the dye-loaded carrier material 4, 7 is removed with absolute ethanol and a partially blue-tinted spectacle lens substrate 1 is obtained.

Figure 12:
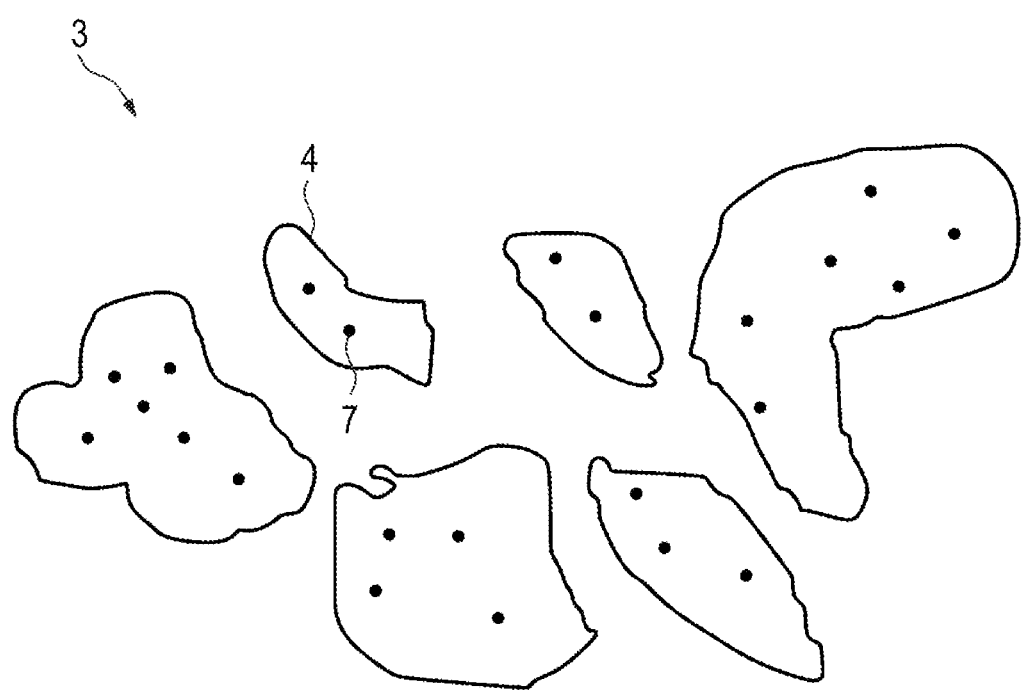
FIG. 12 show a schematic representation of a composition for in-substrate tinting of a polymeric spectacle lens substrate.

FIG. 12 schematically represents a composition 3 for in-substrate tinting, in particular locally resolved in-substrate tinting, of a polymeric spectacle lens substrate 1. The composition 3 can be obtained by the method 200 described with respect to FIG. 11, for example. The composition 3 consists of particles of a carrier material 4 and a dye substance 7 dissolved within the carrier material 7.

The disclosure advantageously enables "printing" a defined pattern 5 either to tint or bleach a spectacle lens substrate 1 in-substrate and, for example, locally resolved with high resolution. The method 100 can be realized in an automated way resulting in reproducibly tinted spectacle lens substrates 1. It can easily be integrated into existing production schemes. No pre-treatment of the spectacle lens substrate 1 and no primer coatings are required, so that the number of process steps can be kept low. Advantageously, the same tint can be obtained on different spectacle lens substrates without variation.

Any type of spectacle lens substrates 1, e.g., pucks, edged etc., can be tinted on one or both sides, i.e., the suggested methods 100 enable the tinting of one side of the spectacle lens substrate 1 only. Moreover, nonlinear color gradients can be created.

Typical features of the disclosure are set forth in the following clauses:

Clause 1. A method for in-substrate tinting of a spectacle lens substrate, the method comprising the following steps: providing a spectacle lens substrate comprising a polymeric lens material, providing a composition comprising a polymeric carrier material, applying a pattern of the composition on a surface of the spectacle lens substrate, and heating the spectacle lens substrate to allow for diffusion of a dye substance between the carrier material and the lens material.

Clause 2. The method of clause 1, further comprising removing the composition from the surface of the spectacle lens substrate.

Clause 3. The method of clause 1 or clause 2, wherein the composition comprises the dye substance contained in the carrier material and wherein the dye substance is transferred from the carrier material into the lens material by diffusion.

Clause 4. The method of clause 3, wherein the composition comprises a saturated dye loaded carrier material.

Clause 5. The method of any one of clauses 1 to 4, wherein the lens material comprises a dye substance and the dye substance is transferred from the lens material into the carrier material by diffusion.

Clause 6. The method of any one of clauses 1 to 5, wherein the pattern of the composition is directly applied on the surface of the spectacle lens substrate.

Clause 7. The method of any one of clauses 1 to 6, wherein the method is carried out in such a way that a tint gradient is obtained.

Clause 8. The method of any one of clauses 1 to 7, wherein a congealing point Tc(carrier) of the carrier material is above a glass transition temperature Tg(lens) of the lens material and wherein the spectacle lens substrate is heated to a temperature above the glass transition temperature Tg(lens) of the lens material and below the congealing point Tc(carrier) of the carrier material.

Clause 9. The method of any one of clauses 1 to 8, comprising the following steps: providing a masking agent, applying a pattern of the masking agent on the surface of the spectacle lens substrate to obtain a partially masked spectacle lens substrate, immersing the partially masked spectacle lens substrate in a tinting bath comprising a dye substance to allow for tinting unmasked areas of the partially masked spectacle lens substrate, and taking the tinted, partially masked spectacle lens substrate out of the tinting bath and removing the masking agent from the surface of the tinted, partially masked spectacle lens substrate.

Clause 10. The method of clause 9, wherein the masking agent is the composition comprising the carrier material.

Clause 11. The method of any one of clauses 1 to 10, wherein the pattern is applied by inkjet printing.

Clause 12. The method of any one of clauses 1 to 11, wherein the carrier material comprises at least one material selected from the group consisting of oxidized polyethylene waxes, non-oxidized polyethylene waxes, oxidized polypropylene waxes and non-oxidized polypropylene waxes.

Clause 13. The method of any one of clauses 1 to 12, wherein the transfer of the dye substance from/into the lens material occurs by diffusion only.

Clause 14. The method of any one of clauses 1 to 13, wherein the heating is carried out before and/or after applying the pattern of the composition.

Clause 15. The method of any one of clauses 1 to 14, wherein a locally resolved in-substrate tinting is obtained.

Clause 16. The method of any one of clauses 1 to 15, comprising the following steps: providing a carrier material and a dye substance, heating the carrier material above its congealing point, dissolving the dye substance in the melted carrier material to obtain a dye loaded carrier material, and cooling the dye loaded carrier material to room temperature.

Clause 17. The method of clause 16, wherein the dye substance is dissolved in the melted carrier until saturation to obtain a saturated, dye loaded carrier material.

Clause 18. The method of clause 16 or clause 17, wherein the solution of the dye carrier is filtrated to remove any dye particles.

Clause 19. The method of any one of clauses 3 to 18, wherein the composition exhibits a uniform concentration of the dye substance throughout the composition.

Clause 20. A spectacle lens substrate with an in-substrate tinting obtainable by one of the above methods.

Clause 21. A composition for in-substrate tinting of a polymeric spectacle lens substrate, the composition comprising a dye loaded carrier material, wherein the carrier material comprises at least one material selected from the group consisting of oxidized polyethylene waxes, non-oxidized polyethylene waxes, oxidized polypropylene waxes, and non-oxidized polypropylene waxes.

Clause 22. The composition of clause 21, wherein the composition allows for transferring the dye substance from the carrier material into a polymeric lens material by diffusion after applying the composition on a surface of a spectacle lens substrate comprising the lens material.

Clause 23. The composition of clause 21 or clause 22, wherein the dye loaded carrier material is a saturated dye loaded carrier material.

Clause 24. The composition of any one of clauses 21 to 23, wherein the composition exhibits a uniform concentration of the dye substance throughout the composition.

Clause 25. A spectacle lens substrate comprising a polymeric lens material, wherein the spectacle lens substrate exhibits a pattern of a composition comprising a polymeric carrier material applied on a surface of the spectacle lens substrate.

Clause 26. The spectacle lens substrate of clause 25, wherein the pattern of the composition is directly applied on the surface of the spectacle lens substrate.

Clause 27. The spectacle lens substrate of clause 25 or clause 26, wherein the composition comprises a dye substance contained in the carrier material.

Clause 28. The spectacle lens substrate of any one of clauses 25 to 27 wherein the pattern is a locally resolved in-substrate tinting.

Clause 29. The spectacle lens substrate of any one of clauses 25 to 28, wherein a congealing point Tc(carrier) of the polymeric carrier material is above a glass transition temperature Tg(lens) of the polymeric lens material.

Clause 30. The spectacle lens substrate of any one of clauses 25 to 29, wherein the carrier material comprises at least one material selected from the group consisting of oxidized polyethylene waxes, non-oxidized polyethylene waxes, oxidized polypropylene waxes, and non-oxidized polypropylene waxes.

Clause 31. The spectacle lens substrate of any one of clauses 25 to 30, wherein the polymeric carrier material is a saturated dye loaded carrier material.

Clause 32. The spectacle lens substrate of any one of clauses 25 to 31, wherein the lens material comprises a dye substance.

Clause 33. The spectacle lens substrate of any one of clauses 25 to 32, wherein the spectacle lens substrate exhibits a pattern of a masking agent.

Clause 34. The spectacle lens substrate of clause 33, wherein the masking agent is the composition comprising the carrier material.

Clause 35. The spectacle lens substrate of any one of clauses 25 to 34, wherein the composition allows for transferring a dye substance from the carrier material into the polymeric lens material and/or a dye substance from the lens material into the carrier material by diffusion upon heating the spectacle lens substrate.

Clause 36. The spectacle lens substrate of any one of clauses 27 to 35, wherein the composition exhibits a uniform concentration of the dye substance throughout the composition.

Clause 37. A spectacle lens substrate comprising a polymeric lens material, wherein the spectacle lens substrate exhibits a pattern of a composition according to any one of the clauses 21 to 24.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMERALS 1 spectacle lens substrate
2 lens material
3 composition
4 carrier material
5 pattern
6 surface
7 dye substance
8 masking agent
9 partially masked spectacle lens substrate
10 tinting bath
11 unmasked area
12 bleached area
100, 200 method
[A] concentration of the dye substance in the carrier material
[B] concentration of the dye substance in the lens material
[W] concentration of the dye substance in the dye reservoir
T temperature
t time
S1 to S13 method steps
Tc(carrier) congealing point of the carrier material
Tg(lens) glass transition temperature of the lens material
T1, T2, T3 time segment

The invention claimed is:

1. A method for in-substrate tinting of a spectacle lens substrate, the method comprising the following steps:
   S1: providing a spectacle lens substrate having a polymeric lens material;
   S2: providing a composition containing a polymeric carrier material;
   S3: applying a pattern of the composition on a surface of the spectacle lens substrate; and
   S4: heating the spectacle lens substrate to allow for diffusion of a dye substance between the polymeric carrier material and the polymeric lens material,
   wherein a congealing point Tc(carrier) of the polymeric carrier material is above a glass transition temperature Tg(lens) of the polymeric lens material.

2. The method as claimed in claim 1, wherein the composition comprises the dye substance contained in the polymeric carrier material and wherein the dye substance is transferred from the polymeric carrier material into the polymeric lens material by diffusion.

3. The method as claimed in claim 2, wherein the composition exhibits a uniform concentration of the dye substance throughout the composition.

4. The method as claimed in claim 2, wherein the composition comprises a saturated dye loaded carrier material.

5. The method as claimed in claim 1, wherein the polymeric lens material comprises a dye substance and the dye substance is transferred from the lens material into the carrier material by diffusion.

6. The method as claimed in claim 1, wherein the pattern of the composition is directly applied on the surface of the spectacle lens substrate.

7. The method as claimed in claim 1, wherein the spectacle lens substrate is heated to a temperature above the glass transition temperature Tg(lens) of the polymeric lens material and below the congealing point Tc(carrier) of the polymeric carrier material.

8. The method as claimed in claim 1, comprising the following steps:
   S6: providing a masking agent;
   S7: applying a pattern of the masking agent on the surface of the spectacle lens substrate to obtain a partially masked spectacle lens substrate;
   S8: immersing the partially masked spectacle lens substrate in a tinting bath containing a dye substance to allow for tinting unmasked areas of the partially masked spectacle lens substrate; and
   S9: taking the tinted, partially masked spectacle lens substrate out of the tinting bath and removing the masking agent from the surface of the tinted, partially masked spectacle lens substrate.

9. The method as claimed in claim 8, wherein the masking agent is the composition comprising the polymeric carrier material.

10. The method as claimed in claim 1, wherein the pattern is applied by inkjet printing.

11. The method as claimed in claim 1, comprising preparing the composition according to the following steps:
S10: providing a carrier material and a dye substance;
S11: heating the carrier material above its congealing point Tc(carrier);
S12: dissolving the dye substance in the melted carrier material to obtain a dye loaded carrier material; and
S13: cooling the dye loaded carrier material to room temperature.

12. The method as claimed in claim 1, wherein the polymeric carrier material comprises at least one material selected from the group consisting of oxidized polyethylene waxes, non-oxidized polyethylene waxes, oxidized polypropylene waxes, and non-oxidized polypropylene waxes.

13. A spectacle lens substrate comprising:
a polymeric lens material, wherein the spectacle lens substrate exhibits a pattern of a composition containing the polymeric carrier material applied on a surface of the spectacle lens substrate, the polymeric carrier material including at least one material selected from the group consisting of oxidized polyethylene waxes, non-oxidized polyethylene waxes, oxidized polypropylene waxes, and non-oxidized polypropylene waxes, wherein the composition includes a dye substance contained in the polymeric carrier material and/or the polymeric lens material includes the dye substance, and wherein the composition allows for transferring the dye substance from the polymeric carrier material into the polymeric lens material and/or the dye substance from the polymeric lens material into the polymeric carrier material by diffusion upon heating the spectacle lens substrate, wherein a congealing point Tc(carrier) of the polymeric carrier material is above a glass transition temperature Tg(lens) of the polymeric lens material.

14. The spectacle lens substrate as claimed in claim 13, wherein the composition exhibits a uniform concentration of the dye substance throughout the composition.

15. A method for in-substrate tinting of a spectacle lens substrate, the method comprising the following steps:
S1: providing a spectacle lens substrate having a polymeric lens material;
S2: providing a composition containing a polymeric carrier material;
S3: applying a pattern of the composition on a surface of the spectacle lens substrate; and
S4: heating the spectacle lens substrate to allow for diffusion of a dye substance between the polymeric carrier material and the polymeric lens material,
wherein the polymeric lens material contains a dye substance and the dye substance is transferred from the polymeric lens material into the carrier material by diffusion.

16. The method as claimed in claim 15, wherein the composition comprises the dye substance contained in the carrier material and wherein the dye substance is transferred from the polymeric carrier material into the polymeric lens material by diffusion.

17. The method as claimed in claim 16, wherein the composition exhibits a uniform concentration of the dye substance throughout the composition.

18. The method as claimed in claim 15, wherein the composition comprises a saturated dye loaded carrier material.

19. The method as claimed in claim 15, wherein the pattern of the composition is directly applied on the surface of the spectacle lens substrate.

20. The method as claimed in claim 15, wherein a congealing point Tc(carrier) of the carrier material is above a glass transition temperature Tg(lens) of the lens material.

21. The method as claimed in claim 15, wherein the spectacle lens substrate is heated to a temperature above the glass transition temperature Tg(lens) of the lens material and below the congealing point Tc(carrier) of the carrier material.

22. The method as claimed in claim 15, comprising the following steps:
S6: providing a masking agent;
S7: applying a pattern of the masking agent on the surface of the spectacle lens substrate to obtain a partially masked spectacle lens substrate;
S8: immersing the partially masked spectacle lens substrate in a tinting bath containing the dye substance to allow for tinting unmasked areas of the partially masked spectacle lens substrate; and
S9: taking the tinted, partially masked spectacle lens substrate out of the tinting bath and removing the masking agent from the surface of the tinted, partially masked spectacle lens substrate.

23. The method as claimed in claim 22, wherein the masking agent is the composition comprising the carrier material.

24. The method as claimed in claim 15, wherein the pattern is applied by inkjet printing.

25. The method as claimed in claim 15, comprising preparing the composition according to the following steps:
S10: providing a carrier material and a dye substance;
S11: heating the carrier material above its congealing point Tc(carrier);
S12: dissolving the dye substance in the melted carrier material to obtain a dye loaded carrier material; and
S13: cooling the dye loaded carrier material to room temperature.

26. The method as claimed in claim 15, wherein the polymeric carrier material comprises at least one material selected from the group consisting of oxidized polyethylene waxes, non-oxidized polyethylene waxes, oxidized polypropylene waxes, and non-oxidized polypropylene waxes.

27. A spectacle lens substrate comprising:
a polymeric lens material containing a dye substance, wherein the spectacle lens substrate exhibits a pattern of a composition containing a polymeric carrier material applied on a surface of the spectacle lens substrate, the carrier material containing at least one material selected from the group consisting of oxidized polyethylene waxes, non-oxidized polyethylene waxes, oxidized polypropylene waxes, and non-oxidized polypropylene waxes, wherein the composition allows for transferring the dye substance from the polymeric lens material into the carrier material by diffusion upon heating the spectacle lens substrate.

28. The spectacle lens substrate as claimed in claim 27, wherein the composition allows for transferring the dye substance from the polymeric carrier material into the polymeric lens material by diffusion upon heating the spectacle lens substrate.

29. The spectacle lens substrate as claimed in claim 28, wherein the composition comprises a dye substance contained in the carrier material.

30. The spectacle lens substrate as claimed in claim 29, wherein the composition exhibits a uniform concentration of the dye substance throughout the composition.

31. The spectacle lens substrate as claimed in claim 27, wherein a congealing point Tc(carrier) of the polymeric carrier material is above a glass transition temperature Tg(lens) of the polymeric lens material.

* * * * *